US011885298B2

(12) United States Patent
Roodenburg et al.

(10) Patent No.: US 11,885,298 B2
(45) Date of Patent: Jan. 30, 2024

(54) OFFSHORE VESSEL, PREFERABLY AN OFFSHORE WIND TURBINE INSTALLATION VESSEL, A CRANE FOR PROVIDING SUCH A VESSEL, AND A METHOD FOR USING SUCH A CRANE, PREFERABLY FOR UPENDING A MONOPILE

(71) Applicant: ITREC B.V., Schiedam (NL)

(72) Inventors: Joop Roodenburg, Schiedam (NL); Terence Willem August Vehmeijer, Schiedam (NL)

(73) Assignee: ITREC B.V., Schiedam (NL)

( * ) Notice: Subject to any disclaimer, the term of this patent is extended or adjusted under 35 U.S.C. 154(b) by 670 days.

(21) Appl. No.: 17/059,828

(22) PCT Filed: May 31, 2019

(86) PCT No.: PCT/NL2019/050319
§ 371 (c)(1),
(2) Date: Nov. 30, 2020

(87) PCT Pub. No.: WO2019/231329
PCT Pub. Date: Dec. 5, 2019

(65) Prior Publication Data
US 2021/0215139 A1 Jul. 15, 2021

(30) Foreign Application Priority Data
Jun. 1, 2018 (NL) ...................................... 2021043
Nov. 26, 2018 (WO) ................ PCT/NL2018/050788

(51) Int. Cl.
F03D 13/25 (2016.01)
B66C 23/52 (2006.01)
(Continued)

(52) U.S. Cl.
CPC .............. *F03D 13/25* (2016.05); *B66C 23/52* (2013.01); *E02B 17/021* (2013.01);
(Continued)

(58) Field of Classification Search
CPC ...................................................... B66C 23/52
See application file for complete search history.

(56) References Cited

U.S. PATENT DOCUMENTS

| 4,238,037 A | 12/1980 | Azovtsev et al. |
| 2006/0074517 A1 | 4/2006 | Schneider et al. |

(Continued)

FOREIGN PATENT DOCUMENTS

| EP | 2 886 722 A1 | 6/2015 |
| TW | 201215538 A1 | 4/2012 |

(Continued)

OTHER PUBLICATIONS

International Search Report, issued in PCT/NL2019/050319, dated Sep. 16, 2019.
Written Opinion of the International Searching Authority, issued in PCT/NL2019/050319, dated Sep. 16, 2019.

*Primary Examiner* — Michael R Mansen
*Assistant Examiner* — Juan J Campos, Jr.
(74) *Attorney, Agent, or Firm* — Birch, Stewart, Kolasch & Birch, LLP

(57) ABSTRACT

An offshore wind turbine installation vessel includes a crane provided with a computerized crane control system. The computerized crane control system is linked to the slew drive, the luffing drive, and the hoisting winch of the crane, and is programmed to perform a foundation pile installation routine providing a coordinated pattern of slew motion of the superstructure and of luffing motion of the boom structure, as well as operation of the hoisting winch so that the load connector of the crane moves from a foundation pile pick up position thereof, where the load connector is con- (Continued)

nected to the top end of a horizontally oriented foundation pile stored on a storage deck, to a foundation pile overhoarding position thereof, wherein the foundation pile is in vertical suspended from the load connector, outside of the hull.

19 Claims, 9 Drawing Sheets

(51) Int. Cl.
    *E02B 17/02*     (2006.01)
    *E02B 17/00*     (2006.01)
(52) U.S. Cl.
    CPC ......... *E02B 2017/0039* (2013.01); *E02B 2017/0065* (2013.01); *E02B 2017/0091* (2013.01); *F05B 2240/95* (2013.01)

(56) References Cited

U.S. PATENT DOCUMENTS

| | | | |
|---|---|---|---|
| 2009/0008351 A1* | 1/2009 | Schneider | B66C 13/46 |
| | | | 212/278 |
| 2017/0275845 A1* | 9/2017 | Belder | E02D 7/06 |
| 2017/0370068 A1* | 12/2017 | Mulderij | E02D 27/42 |
| 2019/0186465 A1* | 6/2019 | Borøy | F03D 13/25 |
| 2021/0206605 A1* | 7/2021 | Rotem | B66C 13/48 |

FOREIGN PATENT DOCUMENTS

| | | | | |
|---|---|---|---|---|
| WO | WO2011/078685 A1 | 6/2011 | | |
| WO | WO-2013093614 A1 * | 6/2013 | ............ | B63B 27/18 |
| WO | WO2018/041663 A1 | 3/2018 | | |
| WO | WO2018/052291 A1 | 3/2018 | | |
| WO | WO2018/088900 A1 | 5/2018 | | |

\* cited by examiner

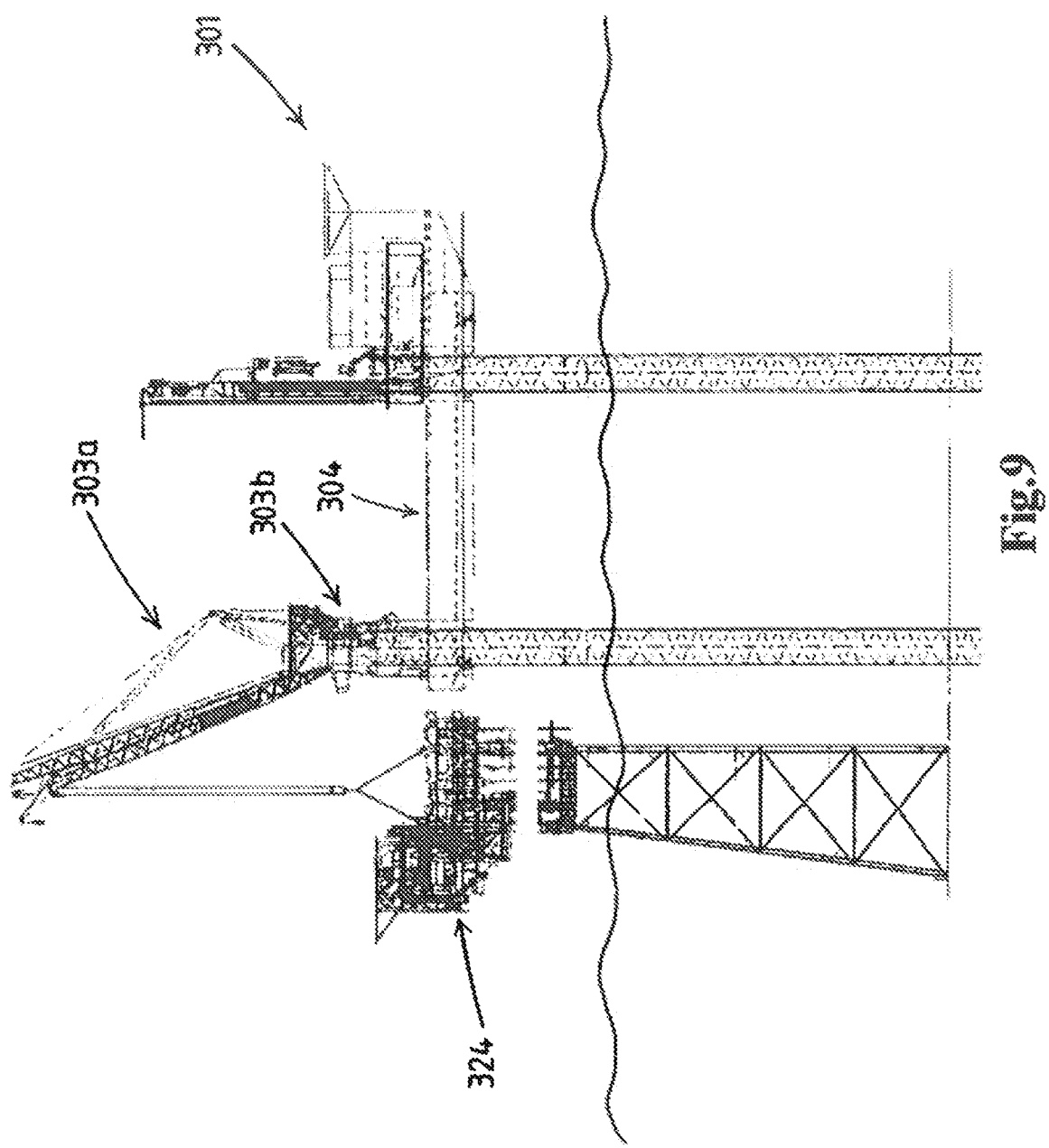

OFFSHORE VESSEL, PREFERABLY AN OFFSHORE WIND TURBINE INSTALLATION VESSEL, A CRANE FOR PROVIDING SUCH A VESSEL, AND A METHOD FOR USING SUCH A CRANE, PREFERABLY FOR UPENDING A MONOPILE

The invention relates to a vessel comprising a crane provided with a computerized crane control system, and to a crane for providing such a vessel.

A first aspect of the invention relates to a vessel configured for installation of a pile adapted to support an offshore wind turbine. The first aspect of the invention further relates to a crane configured for upending a pile, and to a pile upending system, comprising at least one crane and a pile holder or upending cradle.

In a known method for installing an offshore wind turbine, the foundation, in the form of a pile, is installed first by driving the pile into the sea bottom after which the wind turbine is installed on the pile, either by installing the wind turbine at once as a whole or by assembling the wind turbine in parts on the pile. It is for example known to transport masts, or mast sections, complete with nacelle and blades mounted thereon, in an right standing position. The completed mast or completed mast section is installed onto the pile.

There is a trend towards larger wind turbines and a desire to install offshore wind turbines at locations with larger water depths than currently encountered. Both result in larger and heavier foundations. Hence, it is expected that in the near future piles need to be installed that are larger than 100 meters, possibly 120 meters or larger. The weight of such piles may be larger than 1000 mt, possibly 1300 mt or above.

Typically, these large piles are transported in a horizontal orientation. The foundation piles preferably are stored on a storage deck. When the vessel has arrived at the installation site, i.e. the location where the pile has to be driven into the sea floor, a pile is upended and is lifted into an overboard installation position.

The upending process may involve a single crane. The crane lifts the pile at a top end thereof, while a lower end of the pile is supported in a upending cradle mounted on the deck of the vessel. The upending cradle is configured to support the lower end of the pile, preferably pivot with the lower end of the pile, while the pile is upended.

Also, the upending process may involve two cranes, both cranes lifting the pile at a top end thereof, while a lower end of the pile is supported in a upending cradle mounted on the deck of the vessel.

An alternative upending process involves two cranes. One crane lifts the pile at a top end of the pile, while the other crane lifts the pile at a lower end of the pile. Once the pile has been lifted, the first crane lifts the top end of the pile, while the other crane supports the lower end of the pile, preferably at a substantially constant height. As an alternative, the first crane may lift the top end of the pile, while the second crane lowers the opposite end of the pile.

Both upending processes are complicated. Furthermore, the increase in pile sizes requires larger cranes as well. To allow for a crane driver to utilise the full operational window of the crane, the crane preferably should be able to support loads up to or above twice the size of the load actually being hoisted. This is in particular the case with piles, which due to their weight and length may potentially cause extreme loads on the crane and other upending equipment.

It is therefore an object of the invention to provide an offshore vessel comprising a crane capable of efficiently, i.e. fast and/or with comparatively large loads, transporting loads.

This object is achieved by providing an offshore wind turbine installation vessel according to claim 1.

It is an object of the first aspect of the invention to provide an offshore wind turbine installation vessel capable of efficiently, i.e. fast and/or with comparatively small cranes, upending a wind turbine foundation pile.

In an embodiment, an offshore vessel according to the invention comprises:
  a hull having a storage deck,
  a crane comprising:
    a crane base secured to the hull,
    a slewable superstructure mounted on the crane base and slewable about a vertical slew axis relative to the crane base,
    a slew drive configured to cause slew motion of the superstructure about the slew axis,
    a boom structure comprising a boom that is pivotally connected to the superstructure about an inner pivot axis,
    a luffing mechanism comprising a luffing drive and configured to cause luffing motion of the boom structure,
    a hoisting assembly comprising a hoisting winch and a hoisting winch driven cable,
    a load connector, wherein the winch driven cable extends between a sheave on the boom structure and the load connector,
    a computerized crane control system linked to the slew drive, the luffing drive, and the hoisting winch, which computerized crane control system is programmed to perform a routine, providing a coordinated pattern of slew motion of the superstructure and of luffing motion of the boom structure, as well as operation of the hoisting winch, so that the load connector moves along a predefined trajectory.

Thus, a vessel according to the claimed invention comprises a crane configured to transport a load along a predefined trajectory. The trajectory has a start position and an end position. The start and end position do not necessarily need to be a position in which the load is on a support surface. For example, the crane driver may use the crane to lift a container from a vessel into a position, which position than becomes the start position from which the crane transports the container along a predefined trajectory, for example from a supply vessel into a position above a rig, after which the crane driver takes over and lowers the container on the deck of the rig.

The crane running an installation routine reduces the workload of the crane driver, who can now fully concentrate on monitoring the process, and who may intervene if that is deemed necessary. Thus, the crane driver is able to better monitor the overall process. Also, because the load connector is moved along an optimal path, the crane movement can be optimised and the load can be moved efficiently. This may also reduce the time required for hoisting the load to its destination.

Thus, the offshore vessel according to the invention is capable of efficiently, i.e. fast and/or with comparatively small cranes, upending a wind turbine foundation pile.

Furthermore, because the trajectory of the load connector can be controlled by the computerized crane control system, the crane can move the load connector along the ideal path for handling a load, i.e. an optimal combination of a path that allows for quickly moving the load to is destination and the path that is least taxing to the crane structure and capacity. Thus, the crane can be used for lifting larger loads with less risk, and the operational window of the crane can be used optimally.

In a preferred embodiment, the computerised crane control system comprises data on the capacity of the crane, and uses this data to determine an optimal trajectory as the predefined trajectory, preferably in combination with data on the load to be transported, for example data on the weight and/or size of the load. This data may be provided by the crane driver.

In a further embodiment, the computerised crane control system is configured to collect data on the load, for example is provided with sensors that can determine the weight of the load when lifted by the crane. In addition or as an alternative, the crane is for example provided with camera's that provide data on the size of the load to be transported along the predefined trajectory.

In an embodiment, the computerise crane control system is configured to collect further data, for example wind direction and wind force, to generate a predefined trajectory that is least taxing on the crane.

In a further embodiment, the computerised crane control system is configured to adjust the predefined trajectory while the load is being transported along it, for example sensors of the computerised crane control system detect an increase in wind force.

In an embodiment, the computerised crane control system is configured to compute the predefined trajectory, based on a start position and an end position entered by the crane driver.

It is an object of the first aspect of the invention to provide an offshore wind turbine installation vessel capable of efficiently, i.e. fast and/or with comparatively small cranes, upending a wind turbine foundation pile.

In an embodiment, the computerized crane control system is programmed to perform a foundation pile installation routine, so that the load connector moves from a foundation pile pick up position thereof, where the load connector is connected to the top end of a horizontally oriented foundation pile stored on the deck, to a foundation pile upended position thereof, wherein the foundation pile is vertically suspended from the load connector.

In the upended position the foundation pile is supported by the crane. The foundation pile may be suspended above the vessel, to enable the crane driver to perform further crane operations. Thus, the upending of the foundation pile can be fully controlled by the computerised crane control system, and the subsequent positioning of the foundation pile relative to an installation site, to a pile gripper mounted to the hull of the vessel, or to a pile gripper mounted to the hull of another vessel, can be fully controlled by the crane driver.

In a further embodiment, the computerised crane control system is configured to perform other pile transportation routines. In an embodiment, the computerised crane control system is configured to control the positioning of the suspended foundation pile in a pile gripper mounted to the hull of the vessel, e.g. to align the foundation pile with the pile gripper, and to subsequently lower the pile into the pile gripper. In an embodiment, the computerised crane control system is configured to control the lowering of a pile received in a pile gripper towards the sea floor.

In an embodiment, the invention therefore provides an offshore wind turbine installation vessel, wherein the storage deck is configured for storage thereon of one or more wind turbine foundation piles, e.g. monopiles, in horizontal orientation thereof, said foundation piles each having a lower end configured to be driven into the seabed and a top end, wherein the winch driven cable extends in a multi-fall arrangement between a sheave set on the boom structure and a sheave set on the load connector, wherein the computerized crane control system is programmed to perform a foundation pile installation routine providing the coordinated pattern of slew motion of the superstructure and of luffing motion of the boom structure, as well as operation of the hoisting winch so that the load connector moves from a foundation pile pick up position thereof where the load connector is connected to the top end of a horizontally oriented foundation pile stored on the deck to a foundation pile overboarding position thereof wherein the foundation pile is in vertical suspended from the load connector, outside of the hull, and preferably is aligned with a pile gripper configured to maintain the wind turbine foundation pile in vertical orientation during a pile driving operation wherein the foundation pile is driven into the seabed.

In an embodiment, the vessel further comprises a pile gripper, preferably arranged in proximity of the crane, configured to maintain a wind turbine foundation pile in vertical orientation during a pile driving operation wherein the foundation pile is driven into the seabed. In such an embodiment, the computerised crane control system is preferably configured to align a foundation pile supported by the load connector with the pile gripper, more in particular with positioning the foundation pile in the pile gripper.

In an embodiment, the pile gripper is moveably supported by the hull of the vessel, and is provided with a pile gripper control system configured to position the pile gripper relative to the vessel, such that it is aligned with a foundation side installation site adjacent the vessel. In such an embodiment, the pile gripper control system is provided to compensate for movement of the vessel relative to the installation site.

In a further embodiment, the computerised crane control system is linked with the pile gripper control system, to enable the computerised crane control system to take into account the movement of the pile gripper, and thus keep a foundation pile received in the pile gripper and supported by the load connector substantially vertical while the pile gripper is moved relative to the vessel, and thus relative to the crane mounted on the vessel. This is in particular beneficial when the computerised crane control system is configured to position the a foundation pile in the pile gripper and/or when the computerised crane control system is configured to control at least part of the lowering of the foundation pile towards the seafloor.

In an embodiment, the computerised crane control system is configured to track the positon of a pile gripper, e.g. comprises a position determining device to be mounted on the pile gripper, or is provided with sensors, e.g. cameras, configured to track the position of the pile gripper, which pile gripper is mounted on the vessel on which the crane is also mounted, or which is mounted on another vessel located adjacent the vessel on which the crane is mounted.

In an embodiment, the computerized crane control system is programmed to perform a foundation pile installation routine, so that the load connector moves from a foundation pile pick up position thereof, wherein the load connector is connected to the top end of a horizontally oriented foundation pile stored on the deck, to a foundation pile overboarding position thereof, wherein the foundation pile is vertically suspended from the load connector, outside of the hull.

Which predefined trajectory should be selected and how the predefined trajectory should be shaped may be entered by the crane driver. For example, the crane driver may transport a load using the crane, track the trajectory along which the load is transported using the computerised crane control system, save that trajectory as a predefined trajectory in a memory of the computerised crane control system. In another embodiment, the crane driver enters a start position for the load connector and an end position for the load connector, and the computerised crane control system generates an optimal trajectory between both positions, which trajectory is saved in a memory of the computerised crane control system as a predefined trajectory. For example, the crane driver may enter the start position and the end position of the load connector by moving the load connector in said positions. alternatively, the crane driver may indicate the positions by indicating them on a screen of the computerised crane control system, or enter the coordinates of the positions using a key pad of the computerised crane control system.

The predefined trajectory can be predefined in three dimensions relative to the vessel on which the crane is mounted, more in particular relative to the crane mounted on said vessel. The predefined trajectory may also be predefined relative to an object, for example relative to the slewing axis of the crane, relative to the pivot axis of an upending cradle of a pile holder, relative to the bottom end of a pile supported by the load connector or relative to a pile gripper mounted on the hull of the vessel or mounted on the hull of a vessel adjacent the vessel on which the crane is mounted, etc.

For example, when the lower end of the foundation pile is supported in an upending cradle, which upending cradle is configured to pivot with the lower end of the pile while the pile is upended, the predefined trajectory for upending the pile is defined relative to the pivot axis of the foundation pile, e.g. relative to a pivot axis of a pivotably supported clamp of the upending cradle, the clamp securing the bottom section of the pile relative to an upending pivot axis. In such an embodiment, the computerized crane control system is programmed to perform a foundation pile installation routine that is configured to move the top end of the pile along a fixed trajectory relative to the upending cradle.

In an embodiment, the lower end of the foundation pile is supported by a load connector of a second crane, and the predefined trajectory for upending the pile is defined relative to the load connector of the second crane. In a further embodiment, the computerised crane control system also controls the second crane, and thus the position of the load connector of the second crane, and is configured to move both the load connectors relative to each other during the upending of the foundation pile.

In an embodiment, the computerised crane control system comprises an autonomous gps device, which gps device is configured to be mounted on the top end of a foundation pile. The gps device is linked to the computerised crane control system, which is configured use the gps date provided by the gps device to move the upended pile into a predetermined gps position.

In an embodiment, the computerised crane control system comprises an autonomous gps device, which gps device is configured to be mounted on the top end of a foundation pile. The gps device is linked to the computerised crane control system, which is configured use the gps date provided by the gps device to move the upended pile into a predetermined gps position.

In a further embodiment, the foundation pile, when supported in the foundation pile overboarding position, is aligned with a pile gripper configured to maintain the wind turbine foundation pile in vertical orientation during a pile driving operation wherein the foundation pile is driven into the seabed.

In an embodiment, the vessel, more in particular the crane, comprises a computerized crane control system, which computerized crane control system is programmed to perform a foundation pile installation routine providing a coordinated pattern of slew motion of the superstructure, of luffing motion of the boom structure, and of hoisting by the hoisting winch.

Thus, the computerized crane control system is capable of moving the load connector, and thus the load supported by the load connector, from a foundation pile pick up position to a foundation pile overboarding position, along a predefined trajectory.

The predefined trajectory can for example be obtained by running a simulation on shore, and transferring the movements of the load connector from the simulator to the computerized crane control system, after running a successful installation procedure. Alternatively, a crane driver may program an ideal trajectory into the computerized crane control system. Also, the computerized crane control system may be configured to record the trajectory of movement of the load connector during a first installation, which recorded movements can subsequently be used as installation routine in subsequent installations.

Because the trajectory of the load connector can be controlled using the computerized crane control system, the installation routine can be set up to move the load connector along the ideal path for handling a load, i.e. an optimal combination of a path that allows for quickly moving the load to is destination and the path that is least taxing to the crane structure and capacity. Thus, the operational window of the crane can be used optimally, and it is no longer required to use for example a crane that can handle at least two times the load that is actually being hoisted.

The crane running an installation routine reduces the workload of the crane driver, who can now fully concentrate on monitoring the process, and who may intervene if that is deemed necessary. Thus, the crane driver is able to better monitor the overall process. Also, because the load connector is moved along an optimal path, the crane movement can be optimised and the load can be moved efficiently. This may also reduce the time required for hoisting the load to its destination.

Thus, the offshore vessel according to the invention is capable of efficiently, i.e. fast and/or with comparatively small cranes, upending a wind turbine foundation pile.

In an embodiment, the vessel further comprises a pile gripper, preferably arranged in proximity of the crane, configured to maintain a wind turbine foundation pile in vertical orientation during a pile driving operation wherein the foundation pile is driven into the seabed. Thus, the vessel can be used for the full installation process, i.e. during the upending of the pile and also during the pile driving.

In such an embodiment, the vessel preferably also supports a pile driving device on the storage deck, and the crane is configured to lift the pile driving device into a position onto the pile supported by the pile gripper. In an embodiment, the computerized crane control system is configured to run a pile driving device installation routine, the routine preferably comprising lifting the pile installation device form the storage deck, and landing the pile installation device on a pile supported by the pile gripper.

In an embodiment, the invention provides a crane comprising computerized crane control system that allows for running sub routines in a hoisting process. For example, the installation routine may comprises the actual upending process, ending in the pile being supported in the upright position, after which the crane driver takes over and hoists the pile into a position for landing the pile in the pile gripper, after which a pile gripper landing routine is run that moves the pile into the pile gripper, after which the crane driver again takes over and lowers the pile towards the sea floor.

In a preferred embodiment, the computerized crane control system is provided with one or more input devices, e.g. sensors or cameras, to track the position of the load and/or to monitor the environment, for example the relative position of the vessel or an upending cradle mounted on the vessel, and is configured to dynamically amend the installation routine using the information provided by the one or more input devices. For example, to computerised crane control system may adjust the position of the boom and hoisting winch to compensate for titling of the vessel due to a change in load distributed over the working deck.

In an embodiment, the invention provides a crane with a computerized crane control system that is capable of running one or more routines, for example a load lifting routine, or a load landing routine, in which a basic routine of movements is dynamically adjusted to compensate for changes in the environment.

For example, in addition to the computerized crane control system, a crane may be provided with a multiple scanners that provide spatial information on objects located in the crane working area, e.g. the top end of a pile, e.g. a pile supported in by pile gripper mounted to the hull of the vessel. A basic routine of movements for landing a pile driver onto the top end of the pile may be adjusted based on this real time spatial information to compensate for movements of the vessel supporting the crane relative to the pile supported by the sea floor.

In an embodiment, the vessel comprises an upending cradle configured to support the lower end or a lower section of the foundation pile during upending of the foundation pile during the foundation pile installation routine.

Such an upending cradle is configured to assist in the upending process by keeping the lower end of the pile at a substantially fixed, or controlled, position, and by guiding the pivoting movement of the lower end of the pile.

In an embodiment, the computerized crane control system is programmed to perform a foundation pile installation routine that is configured to move the top end of the pile along a fixed trajectory relative to the upending cradle.

It is submitted that an optimal trajectory of the load connector allows for minimizing the loads exerted on the upending cradle in the horizontal plane. This is in particular the case when the upending cradle comprises a pivotably supported clamp, to secure the bottom section of the pile relative to an upending pivot axis. Moving the top end of the pile along a curved trajectory having the pivot point at its centre minimises loads on the upending cradle.

Preferably, the curved trajectory of movement of the load connector lies within a plane that is perpendicular to the pivot axis. Thus, forces directed perpendicular to that plane, i.e. for example parallel to the pivot axis, can be kept to a minimum.

However, performing such an exact hoisting movement is difficult for a crane driver, because it involves a combination of slewing, luffing and hoisting movements. The programmable computerized crane control system enables a fully controlled movement of the load connector, and thus for a minimal load on the upending cradle. The latter can thus be of a compact, low weight design.

Moving the top end of the pile along a curved trajectory having the pivot point at its centre minimises loads on the upending cradle. Preferably, the curved trajectory of movement of the load connector lies within a plane that is perpendicular to the pivot axis. Thus, forces directed perpendicular to that plane, i.e. for example parallel to the pivot axis, can be kept to a minimum.

In an embodiment, the upending cradle comprises a pivotably supported clamp, to secure the bottom section of the pile relative to an upending pivot axis, and the computerised crane control system is configured to measure the angle of the clamp and use this information in controlling the trajectory of the load connector. Preferably, computerised crane control system is provided with one or more sensors, and/or is linked to one or more sensors provided on the pivotable support clamp, which sensors monitor the angle of the pivotable support clamp, and thus monitor the angle relative to the horizontal of the pile supported by the clamp. Thus, this information on the angle of the pile can be used to control, for example adjust, the predefined trajectory of the load connector.

In addition, or as an alternative, the computerised crane control system comprises one or more sensors that monitor the force exerted by the pile onto the cradle and/or by the cradle onto the deck of the vessel. For example, the during the hoisting process, the movement of the load connector in the upward direction may be to fast compared to the movement towards the cradle, causing a the cradle to be pulled towards the load connector. The movement of the load connector can be adjusted to keep the pulling force minimal, preferably clause to zero.

In an embodiment, the vessel is provided with an upending cradle track, and the upending cradle is mounted on that cradle track and is configured to move along a track, during the upending of the foundation pile. By thus moving the cradle, the top end of the pile can be lifted in a purely vertical direction, which facilitates the lifting process. The installation routine may be used to adjust the hoisting speed such that it keeps up with the movement of the upending cradle along the track. In an embodiment, the cradle is provided with a drive, for enabling controlled movement of the cradle along the track, and the computerized crane control system is configured to at least monitor the movement of the cradle, preferably control the drive and thus control the movement of the cradle along the track.

In a further embodiment, the upending cradle is configured to support the foundation pile at the lower end thereof, when the pile has been upended.

In an embodiment, the upending cradle is configured to guide the foundation pile, while the pile, in an upended position, is lowered towards the sea floor. In such an embodiment, the upending cradle is configured to also be used as a pile gripper, and thus extend beyond the periphery of the vessel to maintain a wind turbine foundation pile in vertical orientation during a pile driving operation wherein the foundation pile is driven into the seabed.

In an embodiment, the vessel, preferably the crane of the vessel, further comprises an observation system linked to the computerized crane control system, for tracking movement of the load connector and/or the top end of the wind turbine foundation piles during the foundation pile installation routine, which observation system comprises:

at least one camera, preferably mounted to the boom, to register a crane working area view, preferably a crane working area top view, of the working area of the crane, an augmentation system, linked with the at least one camera and with the crane control system, and configured to combine graphic crane information, e.g. hoisting speed, wind direction, with the real time view registered by the camera into an augmented crane working area view; and a display, e.g. a monitor or a head up display, linked to the augmentation system to present the augmented working area view to a crane driver.

The observation system enables the crane driver to monitor the movement of the load connector, and thus the load supported thereby. In a preferred embodiment, the display projects the programmed trajectory of the load connector according to the installation routine and the actual position, preferably the actual trajectory, of the load connector to facilitate monitoring the routine by the crane driver. The crane driver may stop or overrule the routine if the discrepancy between the actual track and the predetermined track becomes to large.

In a further preferred embodiment, the computerized crane control system allows for the crane driver to adjust the routine to keep the load connector on track, without having to stop the routine.

In an embodiment, the crane driver is allowed to move the load connector towards or away of a predefined trajectory, for example by using a joystick to adjust the position of the load connector relative to the predefined trajectory in a horizontal plane and a handle to adjust the positon of the load connector relative to the predefined trajectory in the vertical direction.

In an embodiment, the computerised crane control system allows for the crane driver to position a marker in for example a top view of the crane working area, and subsequently activate the computerised crane control system to automatically move the load connector into the position of the marker.

In an embodiment, the computerized crane control system comprises an input device, e.g. a key pad, a slot for connecting an information carrier, a wireless connection, etc, that is configured to receive a foundation pile installation routine, to enable the computerized crane control system to perform said foundation pile installation routine.

In an embodiment, the computerized crane control system comprises a control device that is configured to receive a command to start the foundation pile installation routine of the computerized crane control system.

In a further embodiment, the computerized crane control system comprises a control device that is configured to receive a command to stop the foundation pile installation routine of the computerized crane control system.

In an embodiment, the crane is a mast crane, which mast crane preferably is arranged along portside or starboard side of the vessel. In a further embodiment, the vessel comprises two similar mast cranes, both provided with a computerized crane control system, one crane located along the portside and one crane located along the starboard side of the vessel. Mounting the crane or cranes along the portside and/or starboard side of the vessel allows for the center of the vessel to be used for stacking one or more foundation piles, the foundation piles preferably extending in a longitudinal direction of the vessel.

In an embodiment, the crane is a first crane and the vessel further comprises a second crane, which second crane is similar to the first crane, for in addition to the first crane support a foundation pile, wherein the computerized crane control system is linked to a slew drive, a luffing drive, and a hoisting winch of the second crane, and wherein the computerized crane control system is programmed to perform the foundation pile installation routine providing a coordinated pattern of slew motion of the superstructure and of luffing motion of the boom structure, as well as operation of the hoisting winch of both the first crane and the second crane so that the load connector of the first crane and the load connector of the second crane each move from a foundation pile pick up position thereof where the load connector is connected to a horizontally oriented foundation pile stored on the deck to a foundation pile upended position thereof wherein the foundation pile is in vertical position and is suspended from at least the load connector of the first crane.

The first aspect of the invention furthermore provides a crane for providing a vessel according to the first aspect of the invention.

The first aspect of the invention furthermore provides a method for installation of a pile adapted to support an offshore wind turbine, preferably using a vessel according to the first aspect of the invention, the method comprising the following steps:

a. transporting a pile in a horizontal orientation to an offshore installation site;
b. positioning the pile in a pile holder on an installation vessel while being in a horizontal orientation parallel to a longitudinal axis of the vessel, wherein the pile holder engages with a circumference of the pile at a lower side thereof to hold the pile in order to limit movement of the lower side of the pile in a direction perpendicular to a longitudinal axis of the pile, and wherein the pile holder engages with a lower end of the pile in order to limit movement of the pile in a direction parallel to the longitudinal axis of the pile;
c. lifting an upper end portion of the pile, preferably with the lower side in the pile holder, thereby rotating the pile from a horizontal orientation to a vertical orientation about a substantially horizontal rotation axis perpendicular to the longitudinal axis of the vessel, preferably wherein, after rotating the pile from the horizontal orientation to the vertical orientation, the pile is located outside the contour of the vessel seen from above to be lowered into the water;
d. lowering the pile into the water while being held by the pile holder,
e. wherein during step c, and preferably also step d, is/are performed by the computerized crane control system of a vessel according to the invention, and wherein the vessel preferably also carries out step a and step b.

In a further method according to the first aspect of the invention, step d. comprises:

lowering the pile until the pile reaches the sea bottom and until passive lowering of the pile, i.e. lowering of the pile due to the pile sinking into the sea floor due to gravity, stops. It is submitted that the first aspect of the invention, in particular the crane according to the first aspect of the invention, can also be used in lifting piles or mast sections that have been transported to the installation site in an upended position. For example, the piles can be stored on the storage deck with a vertical orientation, requiring one or more cranes to lift the upended pile form the vessel onto the installation site, for example lower the pile into a pile gripper configured to maintain a wind turbine foundation pile in vertical orientation during a pile driving operation wherein the foundation pile is driven into the seabed. The first aspect of the invention allows for using a comparatively light crane, or to use two cranes in unison, for hoisting the pile because the computerised control system, more in particular the foundation pile installation routine, allows to optimally utilise the cranes capacity. Thus there is no need for large cranes, for example cranes mounted on a dedicated crane vessel.

Also, it is known to transport masts, or mast sections, complete with nacelle and blades mounted thereon, in an right standing position onto an installation vessel. Hoisting these completed masts or mast section is a difficult process, due to the blades of the wind turbine possibly colliding with the boom or other objects during the hoisting process. This is in particular the case when the vessel is a jack up vessel, of which the legs, even if they are in an extend position raising the vessel above the water, may limit the movement of the completed mast during the hoisting process. Hoisting the completed mast with a crane according to the first aspect of the invention allows for using an installation routine, comprising a coordinated pattern of slew motion of the superstructure and of luffing motion of the boom structure as well as operation of the hoisting winch so that the load connector, and thus the completed mast, moves from a location on the deck of the vessel to a location at the installation site, for example on top of a pile or a jack up located at the installation site.

In an embodiment, the installation routine comprises only part of the hoisting process. For example, when installing a completed mast section, i.e. with nacelle and blades mounted, the load connector is fixed to the mast section or nacelle, and the completed mast section is lifted from the deck into a routine start position, from which the installation routine is run. The installation routine controls the hoisting of the crane and moves the completed mast into a routine end position above for example a pile section at the installation site. During the installation routine, the crane driver monitors the process, preferably using a display presenting an augmented view of the working area of the crane, and may intervene if deemed necessary. Once the completed mast section has arrived at the routine end position, the crane driver takes over to lower the mast section onto the pile.

The invention furthermore provides a pile upending system, comprising at least one crane and a pile holder to be mounted on a vessel, wherein the pile holder comprises an upending cradle to engage a circumference of the pile at a lower side thereof and to hold the pile in order to limit movement of the lower side of the pile in a direction perpendicular to a longitudinal axis of the pile, and wherein the pile holder engages with a lower end of the pile in order to limit movement of the pile in a direction parallel to the longitudinal axis of the pile.

The pile holder allows for lifting an upper end portion of a pile, of which pile the lower side is engaged by the pile holder, to thereby rotate the pile from a horizontal orientation to a vertical orientation about a substantially horizontal rotation axis.

In an embodiment according to the invention, the wind turbine installation vessel is provided with a pile gripper. A pile gripper is configured to maintain the wind turbine foundation pile in vertical orientation during a pile driving operation wherein the foundation pile is driven into the seabed. In a further embodiment, the pile holder is configured to also function as a pile gripper. In such an embodiment, the upending cradle is configured to guide the foundation pile, while the pile, in an upended position, is lowered towards the sea floor. In such an embodiment. When the upending cradle is configured to be used as a pile gripper, it is able to support the upended pile in an outboard position, i.e. outside the contour of the vessel when seen in top view.

In an embodiment, the pile holder is configures for, after rotating the pile from the horizontal orientation to the vertical orientation, engage the pile while it is located outside the contour of the vessel, and to hold the pile while lowering the pile into the water. In such an embodiment, the pile holder is configured to be used as a pile gripper.

As such, the pile holder can be addressed as upending cradle, and, depending on its configuration as a pile gripper.

By enabling the pile holder to also function as a pile gripper, instead of providing the vessel with a separate pile gripper, there is no need for the pile to be transported into the pile gripper, once it has been upended. This shortens the installation process.

The invention furthermore provides a pile upending system, comprising at least one crane with a computerized crane control system programmed to run a foundation pile installation routine, and an upending cradle configured to support the lower end or a lower section of a foundation pile during upending of the foundation pile during the foundation pile installation routine.

According to a second aspect, the invention furthermore provides an offshore vessel comprising a crane, the crane having a computerized crane control system configured to run a routine, more in particular a load hoisting routine. The second aspect of the invention furthermore provides a crane for providing such a vessel.

According to the second aspect of the invention, such an offshore vessel comprises:
- a hull having a storage deck configured for storage thereon of one or more loads, e.g. containers, monopoles;
- a crane comprising:
- a crane base secured to the hull;
- a slewable superstructure mounted on the crane base and slewable about a vertical slew axis relative to the crane base;
- a slew drive configured to cause slew motion of the superstructure about the slew axis;
- a boom structure comprising a boom that is pivotably connected to the superstructure about an inner pivot axis;
- a luffing mechanism comprising a luffing drive and configured to cause luffing motion of the boom structure;
- a hoisting assembly comprising a hoisting winch and a hoisting winch driven cable;
- a load connector, wherein the winch driven cable extends in a multi-fall arrangement between a sheave set on the boom structure and a sheave set on the load connector;
- a computerized crane control system linked to the slew drive, the luffing drive, and the hoisting winch, which computerized crane control system is programmed to perform a load hoisting routine providing a coordinated pattern of slew motion of the superstructure and of luffing motion of the boom structure, as well as operation of the hoisting winch so that the load connector moves from a routine start position, e.g. a pick up position where the load connector is connected to the load, to a routine end position, e.g. a landing position from which the load can be lowered onto the storage deck of another vessel;
- an input device, linked to the computerized crane control system, which is configured to receive a command to start the load hoisting routine of the computerized crane control system.

Thus, the computerized crane control system, more in particular the load hoisting routine of the computerized crane control system, is configured to move the load connector, and thus a load supported by the load connector, along a predefined path. In an embodiment, the computerised crane control system is provided with sensors or other input devices, that provide the system with real time spatial information of the predefined path, and thus of possible collision objects located on that path and/or on relative movement of the vessel or the load due to for example wind or heave. Preferably, the computerized crane control system is configured to, if possible, dynamically adjust the path to prevent a collision and/or the load from deviating from the predefined path and/or to stop the hoisting routine to prevent a collision or the load form deviating from the predefined path.

The second aspect of the invention furthermore provides an offshore vessel comprising a first crane and a second crane, the cranes having a computerized crane control system configured to run a load hoisting routine with both cranes. The second aspect of the invention furthermore provides a crane for providing such a vessel.

According to the second aspect of the invention, such an offshore vessel comprises:
- a hull having a storage deck configured for storage thereon of one or more loads, e.g. containers, monopoles;
- a first crane and a second crane, each crane comprising:
  - a crane base secured to the hull;
  - a slewable superstructure mounted on the crane base and slewable about a vertical slew axis relative to the crane base;
  - a slew drive configured to cause slew motion of the superstructure about the slew axis;
  - a boom structure comprising a boom that is pivotably connected to the superstructure about an inner pivot axis;
  - a luffing mechanism comprising a luffing drive and configured to cause luffing motion of the boom structure;
  - a hoisting assembly comprising a hoisting winch and a hoisting winch driven cable;
  - a load connector, wherein the winch driven cable extends in a multi-fall arrangement between a sheave set on the boom structure and a sheave set on the load connector;
  - a computerized crane control system linked to the slew drive, the luffing drive, and the hoisting winch, which computerized crane control system is programmed to perform a load hoisting routine providing a coordinated pattern of slew motion of the superstructure and of luffing motion of the boom structure, as well as operation of the hoisting winch so that the load connector moves from a routine start position, e.g. a pick up position where the load connector is connected to the load, to a routine end position, e.g. a landing position from which the load can be lowered onto the storage deck of another vessel;
  - an input device, linked to the computerized crane control system, which is configured to receive a command to start the load hoisting routine of the computerized crane control system;
- wherein the computerized crane control system of the first crane is linked with the computerized crane control system of the second crane, and the computerized crane control systems are configured to run a load hoisting routine utilising both cranes hoisting a single load.

In an embodiment, the computerized crane control system can be linked in a master-slave configuration for hoisting a single load with both cranes. In the master-slave configuration, a crane driver runs the first crane and the computerized crane control systems are linked to make the second crane move with the first crane, more in particular to keep the load connector of the second crane in a fixed position relative to the load connector of the first crane during the hoisting process.

According to a third aspect, the invention furthermore provides an offshore vessel comprising a crane, the crane having an observation system comprising an augmentation system. The third aspect of the invention furthermore provides a crane for providing such a vessel.

According to the third aspect of the invention, such an offshore vessel comprises:
- a hull having a storage deck configured for storage thereon of one or more loads, e.g. containers, monopoles;
- a crane comprising:
  - a crane base secured to the hull;
  - a slewable superstructure mounted on the crane base and slewable about a vertical slew axis relative to the crane base;
  - a slew drive configured to cause slew motion of the superstructure about the slew axis;
  - a boom structure comprising a boom that is pivotably connected to the superstructure about an inner pivot axis;
  - a luffing mechanism comprising a luffing drive and configured to cause luffing motion of the boom structure;
  - a hoisting assembly comprising a hoisting winch and a hoisting winch driven cable;
  - a load connector, wherein the hoisting winch driven cable extends between a sheave on the boom structure and a sheave on the load connector, preferably extends in a multi-fall arrangement between a sheave set on the boom structure and a sheave set on the load connector, and driving the hoisting winch moves the load connector up or down at a crane working area;
  - a computerized crane control system linked to the slew drive, the luffing drive, and the hoisting winch,
  - an observation system, which observation system comprises:
    - at least one camera, preferably mounted to the boom, to register a crane working area view, preferably a crane working area top view, of the working area of the crane,
    - an augmentation system, linked with the at least one camera and with the crane control system, and configured to combine graphic crane information, e.g. hoisting speed, wind direction, with the real time view registered by the camera into an augmented crane working area view;
    - display, e.g. a monitor or a head up display, linked to the augmentation system to present the augmented working area view to a crane driver.

Thus, the crane provides a crane driver with a real time overview of the crane working area. The overview combines a digital representation and/or actual picture of the crane working area, combined with graphic crane information.

In an embodiment, the observation system allows for the crane driver to adapt the augmented crane working area view, e.g. to select which crane information is to be shown, or, in case of multiple camera's, which viewing angle of the crane working area.

In an embodiment, the observation system comprises multiple camera's that provide different viewing angles of the crane working area, or may provide views of different areas. For example, in an embodiment one camera is set up to monitor the location of origin of a load to be lifted, one camera is set up to monitor the location of destination of the load to be lifted, and three cameras are set up to monitor the crane working area, with two mounted to the boom of the crane and one mounted to the super structure of the crane, such that when the load is moved from the one location to the other.

Also, views of multiple camera's may be combined. For example, a first camera may register a person, which person is blocked from view by a container in the view of a second camera. When the crane driver is present with the view of the second camera, a graphical representation of the parson may be projected on the container to indicate to the crane driver a person is located behind the container.

In an embodiment, the observation system comprises a single display, and is set up to show multiple views on that display at the same time and/or to switch between full screen views. In addition or as an alternative, the observation system may comprise a head up display, for example by projecting digital information on the window of the crane driver cabin, or on a see through display mounted on the crane drivers control panel. With the head up display configuration, the view registered by the camera should align with the line of view of the crane driver. The picture registered by the camera is used by the augmentation system to correctly place graphic crane information on the head up display. In case only a head up display is used, instead of a camera and object recognition software can be replaced by a scanner, which scanner records spatial information.

The spatial information can for example also be used to project a digital image of an object onto the display, when that object is not, or is not fully visible. For example, due to poor visibility conditions, for example cause by fog or poor lighting conditions, or an obstructed direct view from the crane drivers cabin, important objects, such as a load carried by the crane or a potential collision objects such as another crane mounted on the vessel, may not be fully visible to the crane driver. The augmented view can thus provide the crane driver with a digital representation. e.g. a line drawing or a fully rendered drawing, of an object such as another crane mounted on the vessel, that is projected on the display to indicate the presence and location of the object.

In an embodiment, the computerized crane control system and/or the observation system may be provided with sensors and camera's to obtain additional information, such as an infrared camera, a night view camera, a camera that allows for substantial magnification of the picture to enable zooming in on the view provided, object detection sensors, scanners such as laser scanners or ultra sound scanners, lidar, etc.

The term 'crane information" may refer to any type of information relevant to the hoisting process, and may comprise information on the load to be lifted, on the vessel on which the load is located, wind direction, logistic planning information, etc.

In an embodiment, the augmentation system comprises spatial information of the vessel and the crane, for example comprises a 3D model of the vessel and the crane, and is configured to use this spatial information to present the crane driver with potential collision objects, e.g. a control station located adjacent the storage deck of the vessel. Also, the spatial information may be combined with functional information, such as areas that are designated 'storage area' and are thus accessible for landing loads, and areas that are designated 'personnel area' and are thus off limits to the crane.

Also, the spatial information can be combined with logistic information, for example to identify different loads stacked on the deck, but also to present the crane driver with information on which load should be handled first or where a particular load should be landed on the deck.

The spatial information can be obtained from a database and/or can be obtained by scanning the surroundings of the crane.

In an embodiment, the augmentation system is configured to scan at least the working area of the crane, preferably the surroundings of the crane, to obtain spatial information on temporarily objects, such as containers stacked on the storage deck of the vessel.

In an embodiment, the observation system comprises a scanning device for scanning the working area and an area directly adjacent the working area, to obtain real time 3D area information. In an embodiment, a camera and object recognition software are used, in addition, or as an alternative, a spatial sensor such as a laser scanner is used to register spatial information of the working area.

In an embodiment, the observation system comprises one or more spatial sensors, for example laser scanners or ultrasonic scanners, to register, preferably continuously register, the surroundings of the crane. Thus, the spatial information available to the augmentation system can be updated. Changes in the environment, for example due to stacking objects on the storage deck, can be incorporated in the augmented view.

The spatial sensors can be located on the crane. In an embodiment, the sensors are located on the super structure of the crane and/or the boom of the crane, such that the area scanned by the sensors moves with the crane when the latter is slewed by the slew drive. In an embodiment, the sensors can be mounted on the vessel, for example along different positions along a storage deck, to provide spatial information of an area from different angles. This is in particular beneficial when the area comprises fixed or temporarily obstacles, such as containers stacked on the storage deck. For example, in an embodiment, the vessel is provided with multiple sonar sensors to register container positions on the storage deck from several angles.

In addition, or as an alternative, one or more spatial sensors can be mounted on the boom of the crane, e.g. at the top of the boom, to provide a top down view of the crane working area. In an embodiment, the load connector can be provided with sensors and/or camera's to scan the crane working area and/or provide information, e.g. a real time top down view of the working area, to the crane driver.

In an embedment, mobile sensors are temporarily mounted to the load, for example to a container, to register the surroundings of the container, and for example the proximity of other objects and/or the load connector, or to register the location of the load relative to the spatial information present in the augmentation system. In an embodiment, the augmented view displays the position of the load connector relative to the boom, more in particular relative to the position at which the hoisting cable is supported by the boom. Thus, the augmented view may in a top view of the crane working area indicate the side lead and/or the offlead of the load connector. In an embodiment, the augmented view may show the crane operator information on the speed of the load connector and the position of the load connector relative to the storage deck or relative to a load located on the storage deck.

Also, sensors can be incorporated in the working deck, for example to subdivide the storage deck in multiple storage areas and register of an object is present or not at these storage areas. In addition, or as an alternative, the storage deck may be provided with markers that optimally register on sensors mounted on the crane, to thus enhance the spatial registration of the working deck by said sensors.

In an embodiment, the augmented view displays the distance between the load connector, and/or the load supported by the load connector, and the crane drivers cabin, or, in case of a top down view of the working area, the distance between the top of the boom and the load connector, and/or the load supported by the load connector.

In an embodiment, the augmentation system is configured to project a path for the crane driver to follow with the hoisted load, to safely transfer the load to its storage location. In an embodiment, the crane driver enters a start location and an end location, and the computerized crane control system or the augmentation system generates the optimal path between those locations. In an alternative embodiment, the augmentation system comprises logistic information on the load to be hoisted, and thus knows the start and/or end location, and generates path based on that information when the crane driver selects the load to be hoisted.

The path can for example be projected in the form of three dimensional line which is to be followed with the hoisted load, or in the form of a virtual tunnel, marked by subsequent rectangular frames, the tunnel defining the boundaries within which the load should be kept to obtain an optimal transfer from one location to the other.

In a further embodiment, the computerized crane control system linked to the slew drive, the luffing drive, and the hoisting winch, and computerized crane control system is configured to automatically hoist a load along a pre-programmed path, the path being generated by the augmentation system, the computerized crane control system or the crane driver.

In an embodiment, the augmentation system is configured to display both the position of the load connector and the path to be followed, preferably at least in a top view, such that the augmented view displays the difference between the path and the position of the load connector, and thus the side lead and/or the offlead of the load connector relative to the path. This allows the crane driver to adjust the position of the load connector, by controlling the luffing mechanism and/or the hoisting mechanism and/or the slew drive, to keep the offset between the path and the actual load minimal. In a further embodiment, the computerised crane control system is configured to make the adjustments to thus automatically keep the load on the pre-set trajectory.

In an embodiment, the augmentation system is configured to perform a load hook alignment routine, i.e. is configured to monitor both the position of the load connector and the load to be lifted, preferably at least in a top view, and is configured to, in combination with the computerized crane control system, keep the load connector in a substantially fixed horizontal position relative to the load, in particular prior to the load being lifted from a storage deck of a supply vessel, to thus minimize swinging of the load after lift of by inaccurate crane positioning.

In an embodiment, the augmentation system is configured to compensate for heave, more in particular for heel and trim, of a vessel on which the load is located. In an embodiment, the observation system is provided with scanners, for example a camera or a laser scanner, to track the movement of a platform, for example a storage deck, on which the load to be lifted is located.

In addition, or as an alternative, the augmentation system is provided with sensors that detect the location of the load connector, e.g. crane hook, relative to the boom tip, with sidelead/offlead sensors that monitor the departure angle of the hoisting cable at sheave mounted at the boom structure. In an embodiment, the sensor consists of a device, moveably supported at the tip of the boom, that will follow the movement of the hoisting wire using two small sheaves enclosing the hoisting wire. The position of the device is measured using encoders. The measurement is enhanced with measurements of a motion reference unit that provide information of the orientation of the crane relative to the horizontal plane. When the sidelead exceeds the threshold associated with the selected crane curve, a warming will be generated for the crane driver.

The said hook alignment routine enables the computerized crane control system to adjust the position of the load connector, by controlling the luffing mechanism and/or the hoisting mechanism and/or the slew drive, to keep the offset between the load connector and the load minimal.

In an embodiment, the augmentation system is configured to perform a lift-off routine, i.e. is configured to monitor both the position of the load connector and the load to be lifted, preferably at least in a top view, and is configured to, in combination with the computerized crane control system, keep the load connector in a substantially fixed vertical position relative to the load, in particular prior to the load being lifted from a storage deck of a supply vessel, to thus minimize slag or tension in the hoisting wire at the moment of lift-off. In an embodiment, the augmentation system is configured to compensate for heave of a vessel on which the load is located. In an embodiment, the observation system is provided with scanners, for example a camera or a laser scanner, to track the vertical movement of a platform, for example a storage deck, on which the load to be lifted is located.

Thus, the augmentation system is configured to, in combination with the computerized crane control system, control the hoist winch and provide automatic heave compensation. In addition, the hoisting assembly and/or the computerized crane control system are configured to provide heave compensation once the load connector has been connected to the load, by monitoring the tension hoisting wire.

In a further embodiment, the augmentation system in combination with the computerized crane control system is configured to automatically instigates the lift off, and to time the lift-off with the heave of the vessel on which the load is located.

In such an embodiment, the system predicts the optimal timing for lifting a load. For example, the computerized crane control system and/or the observation system may be configured to perform a lift-off routine. The lift off routine is used to analyse the motion of the vessel on which the crane is mounted and/or the motion of the load to be lifted and/or the motion of the crane relative to the load to be lifted, and based on that information determines the optimal timing for initiating a lifting operation, e.g. from the seabed or a supply vessel. In an embodiment, the optimal timing is when the load is at its maximum height and/or the vertical distance between the boom structure and the load is at a minimum.

The same system can also be used to compensate for heave of the vessel on which the crane is mounted, for example relative to a fixed platform or relative to the sea floor, e.g. when landing an object on the sea floor. The system can also be used to compensate for relative heave between the vessel on which the crane is mounted and a vessel on which the load to be lifted is located.

In an embodiment, the augmentations system comprises mobile spatial scanners, to provide spatial information. For example, a person or a drone can be equipped with a mobile spatial scanner to register spatial information on a supply vessel, for example on the location and relative position of equipment located on the storage deck of the supply vessel, and provide this information to the augmentation system. In an embodiment, the load connector is provided with a mobile spatial scanner, and is moved over the storage deck to map the storage deck and the loads stacked on it, prior to starting any hoisting action.

In an embodiment, the observation system is configured to track the load trajectory, i.e. the trajectory followed by the load while being hoisted by the crane, and preferably to project potential load trajectory, and to present this information to the crane driver in the augmented view display.

In a further embodiment, the observation system is configured to sound an alarm when it detects a possible collision between the load trajectory data and the three dimensional area data.

In an embodiment, the observation system is configured to alert the crane driver if the potential trajectory of the boom, or of a load hoisted by the crane collides with an object. In a further embodiment, the observation system is linked to the computerized crane control system, and the latter is configured to stop the movement, or adjust the trajectory, of the boom or load to prevent a collision from occurring.

In an embodiment, the observation system comprises a camera and optical recognition software, to monitor presence of personal in the crane working area, and the augmentation system is configured to signal and indicate the presence of personal in the crane working area to the crane driver. In a further embodiment, the observation system is linked to the computerized crane control system, and the latter is configured to stop the movement, or adjust the trajectory, of the load connector to prevent a collision from occurring or to prevent a load from being moved in a position above, or within a predetermined range of, personnel detected by the observation system.

In an embodiment, the observation system is configured to track the movement of the load connector and a load supported by the load connector, preferably by way of a top down view of the crane working area, and is linked to the computerized crane control system to assist in controlling the load during hoisting operations. For example, the observation system and the computerized control system can be linked to prevent, or at least reduce, overshoot of the load, casing swinging of the load, at the end of a swivel and/or slewing motion of the crane. In such a situation, when the crane arm stops moving, momentum will cause the suspended load to continue on its path. To stabilize the load, the observation system and computerized crane control system can detect this situation, and be configured to move the boom to follow the load's center of gravity, overshooting slightly at the end of the swing in each direction, to compensate for momentum and keep the load stable.

It is submitted that a crane driver of an off shore crane has to deal with a complicated environment. For example weather conditions, such as fog and rain, may obstruct visibility, or, in the form of heave and wind, may influence the location and/or trajectory of loads stacked on a storage deck or hoisted by the crane.

By providing the crane driver with additional information on weather conditions, special information of the working area, hoisting information, and presenting these in the form of an augmented view, the third aspect of the invention allows for simplifying crane operation, and enables an increased window of operating conditions.

According to a fourth aspect, the invention furthermore provides an offshore vessel comprising a crane, the craning having a computerized crane control system configured to perform an auto hook height routine and/or a level hook height routine. The invention furthermore provides a crane for providing such a vessel.

According to the fourth aspect of the invention, the offshore vessel comprises:
- a hull having a storage deck configured for storage thereon of one or more loads, e.g. containers, monopoles;
- a crane comprising:
  - a crane base secured to the hull;
  - a slewable superstructure mounted on the crane base and slewable about a vertical slew axis relative to the crane base;
  - a slew drive configured to cause slew motion of the superstructure about the slew axis;
  - a boom structure comprising a boom that is pivotably connected to the superstructure about an inner pivot axis;
  - a luffing mechanism comprising a luffing drive and configured to cause luffing motion of the boom structure;
  - a hoisting assembly comprising a hoisting winch and a hoisting winch driven cable;
  - a load connector, wherein the hoisting winch driven cable extends between a sheave on the boom structure and a sheave on the load connector, preferably extends in a multi-fall arrangement between a sheave set on the boom structure and a sheave set on the load connector, and driving the hoisting winch moves the load connector up or down at a crane working area;
  - a computerized crane control system linked to the slew drive, the luffing drive, and the hoisting winch, which computerized crane control system is programmed to perform:
an auto hook height routine, which auto hook height routine comprises, during a luffing of the boom structure, driving the hoisting winch to keep the vertical distance between the load connector and the boom structure, more in particular the sheave on the boom structure, substantially constant, such that effectively, during the luffing of the boom the load connector is moved with the boom structure;
and/or
a level hook height routine, which level hook height routine comprises, during a luffing of the boom structure, driving the hoisting winch to keep the vertical distance between the load connector and the storage deck of the vessel substantially constant, such that effectively, during the luffing of the boom the load connector, and a load supported by that load connector, is kept at a constant height.

For the auto hook height routine, the computerized crane control system is configured to monitor the relative position of the load connector, i.e. the position of the load connector relative to the boom, more in particular the distance, or height, between the load connector and the boom. This distance or height is similar to the free hanging wire, i.e. the hoisting wire extending between boom and load connector.

Furthermore, with the auto hook height routine, the computerized crane control system is configured to keep the position of the load connector relative to the boom constant during luffing, i.e. while the angle of the boom with the horizontal is changed by pivoting the boom about the inner pivot axis.

In an embodiment, the computerized crane control system is configured to collect data on the boom position from the luffing mechanism. In addition, or as an alternative, sensors or scanners may be provided that monitor the angle of the boom and/or the position of the load connector relative to the crane, for example relative to the boom. The information is used to control the hoisting winch and thus the vertical position of the load connector during the luffing of the boom. In an embodiment, the crane is provided with a camera that registers the crane working area, and the position of the load connector in the crane operations area. For example object recognition software is used by the computerized crane control system to monitor the relative position of the load connector, i.e. the position of the load connector relative to the boom. In an embodiment, the load connector is provided with optical markers and/or or other identification devices, e.g. rfid tag, to optimize tracking of the load connector by the camera and/or sensors of the computerized crane control system.

The auto hook height routine is in particular useful when the load connector is in the raised position, i.e. close to the sheave on the boom structure, and is to be kept in that position during lowering or raising of the boom. Because the hoisting wire typically extends at an angle to the boom, luffing of the boom changes the length of the free hanging wire, i.e. the wire extending between the boom and the load connector. Thus, in the prior art, typically a minimal distance is kept between the load connector and the boom, to prevent a luffing action, in particular a lowering of the boom, to cause the load connector to crash into the boom. The distance between load connector and boom provides a safety margin, that allows for the crane driver to timely take control over the hoisting winch to extend the hoisting wire and thus prevent the load connector from colliding with the boom. A drawback of this solution is that the length of wire extending between the boom and the load connector may cause swinging of the load connector during a luffing action. It takes extra time to control a swinging load connector. Furthermore, the swinging may cause the load connector to collide with the boom.

Typically, the auto hook height routine according to the fourth aspect of the invention is performed by a crane driver while performing a luffing operation. A luffing operation requires the crane driver to actively control both the luffing drive and the hoisting winch at the same time. The auto hook height routine allows for the crane driver to fully focus on the luffing drive, because the hoisting winch is controlled by the computerized crane control system. The auto hook height routine thus facilitates crane operations.

For the level hook height routine, the computerized crane control system is configured to monitor the relative position of the load connector, i.e. the position of the load connector relative to the storage deck, more in particular the distance, or height, between the load connector and the storage deck.

Furthermore, with the level hook height routine, the computerized crane control system is configured to keep the position of the load connector relative to the deck constant during luffing, i.e. while the angle of the boom with the horizontal is changed by pivoting the boom about the inner pivot axis.

The level hook height routine according to the forth aspect of the invention is in particular useful when the angle of the boom is to be adapted, for example to move the load supported by the load connector towards or away from the crane. The level hook height routine keeps the vertical position of the load constant during the luffing operation. Thus the load is not raised or lowered, and the potential energy of the load is kept constant, which allows for an efficient luffing operation.

Typically, the level hook height routine is performed by a crane driver while performing a luffing operation. A luffing operation requires the crane driver to actively control both the luffing drive and the hoisting winch at the same time. The level hook height routine allows for the crane driver to fully focus on the luffing drive, because the hoisting winch is controlled by the computerized crane control system. The level hook height routine thus facilitates crane operations.

Thus, according to the fourth aspect, the invention provides a crane provided with a computerized crane control system that is programmed to perform the auto hook height routine during luffing, with a computerized crane control system that is programmed to perform the level hook height routine during luffing, or with a computerized crane control system that is programmed to perform the auto hook height routine during luffing and that is programmed to perform the level hook height routine during luffing.

In an embodiment, the computerized crane control system comprises an input device, which is configured to enable the crane driver to input a desired height of the load connector relative to the boom or to the storage deck. In an embodiment the crane driver is able to "lock" the current height of the load connector, such that he can concentrate on luffing operations without having to control the hoisting winch.

In addition, or as an alternative, in an embodiment the computerized crane control system allows for the crane driver to input a desired position for the load connector, for example select a parking position in which the load connector is located adjacent to the boom, or enter a height in meters relative to the storage deck surface of the vessel, and the computerized crane control system is configured to move the load connector in that position, and maintain the load connector at that position during subsequent luffing operations.

Preferably, the computerized crane control system is provided with an load connector collision prevention function, which prevents the load connector from collision with the boom structure during luffing and/or hoisting operations. For example, the computerized crane control system may be provided with proximity detectors located on the boom structure and/or the load connector to detect the load connector closing in on the boom, and may be configured to signal a warning to the crane driver, and preferably be configured to control the luffing mechanism and/or the hoisting winch to prevent a collision between the boom structure and the load connector by stopping the luffing action and/or adjusting the length of the hoisting wire.

Thus, the computerized crane control system is configured to assist the crane driver in maintaining the load connector, and a load supported by that load connector, at a set height, relative to the boom or to the storage deck, while adjusting the angle of the boom. This is in particular beneficial when the luffing action is combined with slewing the crane, which in the prior art requires the crane driver to control the slew drive, the luffing drive, and the hoisting winch at the same moment.

By providing the crane driver with the auto hook height routine and/or the level hook height routine, the fourth aspect of the invention allows for simplifying crane operation.

In a further embodiment according to the fourth aspect, the crane comprises multiple load connectors, each with a dedicated hoisting assembly, the hoisting assembly comprising a hoisting winch and a hoisting winch driven cable.

For each of the multiple load connectors, the hoisting winch driven cable extends between a sheave on the boom structure and a sheave on the load connector, preferably extends in a multi-fall arrangement between a sheave set on the boom structure and a sheave set on the load connector. Driving the hoisting winch moves corresponding load connector up or down at a crane working area.

Furthermore, the computerized crane control system is linked to the hoisting winches, and is programmed to perform for each load connector an auto hook height routine and/or a level hook height routine.

Thus, for example with a crane having a first and a second load connector, the crane driver can set the position of one load connector at a constant distance relative to the boom or the working deck, while hoisting a load with the other load connector.

For example, one load connector can be set in a parking position adjacent the boom using the auto hook height routine, while the other load connector is used to transport a load away from the crane by pivoting the boom structure downwards, using the level hook height routine with the hoisting winch of the second load connector to keep the load supported by the second load connector at a constant height during the luffing action.

Also, a single load can be lifted with two load connectors, which can both be set at a constant height relative to the working deck during a luffing action, to keep the load level and in a constant position.

In a further embodiment according to the fourth aspect, the crane comprises multiple load connectors, each with a dedicated hoisting assembly, the hoisting assembly comprising a hoisting winch and a hoisting winch driven cable. Driving the hoisting winch moves corresponding load connector up or down at a crane working area.

Furthermore, the computerized crane control system is linked to the hoisting winches, and is programmed to perform for each load connector an auto slave height routine, which routine involves to keep the connector at a constant level with a master load connector. Thus, when a load is supported by multiple load connectors, the crane driver only has to manipulate a single hoisting winch. This facilitates transporting a load supported by multiple load connectors, more in particular facilitates keeping that load level during luffing operations, and during lifting and lowering of the load.

In a further embodiment according to the fourth aspect of the invention, the computerized crane control system linked to the slew drive, the luffing drive, and the hoisting winch, and is programmed to limit the acceleration, speed and deceleration of the load, due to limmintg the luffing speed and the slewing speed, during luffing and slewing actions to prevent swinging of the load.

According to a fifth aspect, the invention furthermore provides an offshore vessel comprising a crane, the craning having a collision prevention system. The fifth aspect of the invention furthermore provides a crane for providing such a vessel.

According to the fifth aspect of the invention, such an offshore vessel comprises:
a hull;
a crane comprising:
a crane base secured to the hull;
a slewable superstructure mounted on the crane base and slewable about a vertical slew axis relative to the crane base;
a slew drive configured to cause slew motion of the superstructure about the slew axis;
a boom structure comprising a boom that is pivotably connected to the superstructure about an inner pivot axis;
a luffing mechanism comprising a luffing drive and configured to cause luffing motion of the boom structure;
a hoisting assembly comprising a hoisting winch and a hoisting winch driven cable;
a load connector, wherein the winch driven cable extends, preferably in a multi-fall arrangement, between a sheave set on the boom structure and a sheave set on the load connector;
a computerized crane control system linked to the slew drive, the luffing drive, and the hoisting winch; and
a collision prevention system, comprising multiple proximity detectors, e.g. camera's with object recognition software or laser scanners, which proximity detectors are located along at least a top section of the boom structure to scan a collision safety zone extending adjacent at least the top section of the boom structure, to detect an object entering the collision safety zone during a slew motion and/or a luffing motion and to subsequently present a crane driver with a warning signal and/or stop the slew motion and/or luffing motion of the boom to prevent a collision with the detected object.

In an embodiment, the area next to and under the crane boom is scanned by using LIDAR sensors.

By providing crane with a collision prevention system, the fifth aspect of the invention allows for simplifying crane operation. Furthermore, the collision prevention system is particularly beneficial when performing crane operations under conditions with poor visibilities, for example at night, or with severe weather conditions, such as rain, fog or snow.

Preferably, the data obtained by the proximity detectors is graphically presented to the crane driver, for example on a display in the operator cabin. In addition, if the crane boom enters a dangerous zone, an audible alarm and/or visual alarm will be activated.

In an embodiment, the collision prevention functionality is activated by default when the crane system is switched on, but can be deactivated by the crane operator when needed. According to a sixth aspect, the invention furthermore provides an offshore vessel comprising a crane, the craning having a computerized crane control system linked to a slew drive, a luffing drive and a hoisting winch of the crane, which computerised crane control system is configured to move a load connector of the crane, and thus a load supported by the load connector, along a predefined trajectory.

The computerized crane control system is linked to the slew drive, the luffing drive, and the hoisting winch of the crane and is programmed to perform a routine providing a coordinated pattern of slew motion of the superstructure and of luffing motion of the boom structure, as well as operation of the hoisting winch, to thus move the load connector along a predefined trajectory.

The predefined trajectory can for example be obtained by running a simulation on shore, and transferring the movements of the load connector from the simulator to the computerized crane control system. Alternatively, a crane driver is enabled to program an ideal trajectory into the computerized crane control system. For example, the trajectory can be entered using an editor. Points on the trajectory are entered and the editor will determine the optimal route in between. The editor is for example part of the comprised crane control system and can be accessible in the crane control cabin. In addition, or as an alternative, the editor is available as standalone application so that lifts can be engineered independent of the crane.

Also, the computerized crane control system may be configured to record the trajectory of movement of the load connector, which recorded movements can subsequently be used as the predefined trajectory.

Because the trajectory of the load connector can be controlled using the computerized crane control system, the predefined trajectory can be set up to move the load connector along the ideal path for handling a load, i.e. an optimal combination of a path that allows for quickly moving the load to is destination and the path that is least taxing to the crane structure and capacity. Thus, the operational window of the crane can be used optimally, and it is no longer required to use for example a crane that can handle at least two times the load that is actually being hoisted.

In a further embodiment, the crane is furthermore provided with an observation system linked to the computerized crane control system, for tracking movement of the load connector, which observation system preferably comprises:
- at least one camera, preferably mounted to the boom, to register a crane working area view, preferably a crane working area top view, of the working area of the crane,
- an augmentation system, linked with the at least one camera and with the crane control system, and configured to combine graphic crane information, e.g. hoisting speed, wind direction, with the real time view registered by the camera into an augmented crane working area view; and
- a display, e.g. a monitor or a head up display, linked to the augmentation system to present the augmented working area view to a crane driver.

The observation system enables the crane driver to monitor the movement of the load connector, and thus the load supported thereby. In a preferred embodiment, the display projects the programmed trajectory of the load connector according to the predefined trajectory and the actual position, preferably the actual trajectory, of the load connector to facilitate monitoring by the crane driver. The crane driver may stop or overrule the routine, i.e. the controlled movement along the predefined trajectory, if the discrepancy between the actual trajectory and the predefined trajectory becomes too large.

In a further preferred embodiment, the computerized crane control system allows for the crane driver to adjust the routine, i.e. the predefined trajectory, to keep the load connector on track, without having to stop the routine.

In an embodiment, the observation system is configured to track the load trajectory, i.e. the trajectory followed by the load while being hoisted by the crane, and preferably to project potential load trajectory, and to present this information to the crane driver in the augmented view display.

In a further embodiment, the observation system is configured to sound an alarm when it detects a possible collision between the load trajectory data and the three dimensional area data.

In an embodiment, the observation system is configured to alert the crane driver if the potential trajectory of the boom, or of a load hoisted by the crane collides with an object. In a further embodiment, the observation system is linked to the computerized crane control system, and the latter is configured to stop the movement, or adjust the trajectory, of the boom or load to prevent a collision from occurring.

In an embodiment, the observation system comprises a camera and optical recognition software, to monitor presence of personal in the crane working area, and the augmentation system is configured to signal and indicate the presence of personal in the crane working area to the crane driver. In a further embodiment, the observation system is linked to the computerized crane control system, and the latter is configured to stop the movement, or adjust the trajectory, of the load connector to prevent a collision from occurring or to prevent a load from being moved in a position above personal detected by the observation system.

In an embodiment, the crane driver controls the speed at which the load connector follows the predefined trajectory. In a further embodiment, the computerized control system is configured to bring the load connector to a controlled stand still when the crane driver releases the controls.

In an embodiment, the predefined trajectory can be set for the XY-plane, the computerised crane control system controlling the slewing and luffing motion of the crane only, and leaving the crane driver in control of the lifting height.

In an embodiment, the predefined trajectory can be set for the XYZ-plane, the computerised crane control system controlling the slewing, luffing and hoisting motion of the crane.

According to a seventh aspect, the invention furthermore provides an offshore vessel comprising a crane, the craning having a computerized crane control system, linked to the slew drive, the luffing drive, and the hoisting winch of the crane as set out above, which computerized crane control system is configured to control the slew motion of the superstructure and the luffing motion of the boom structure, as well as the hoisting winch of the crane.

The crane is furthermore provided with an observation system linked to the computerized crane control system, for tracking movement of the load connector, which observation system comprises:
- at least one camera, preferably mounted to the boom, to register a crane working area view, preferably a crane working area top view, of the working area of the crane,
- an augmentation system, linked with the at least one camera and with the crane control system, and configured to combine graphic crane information, e.g. hoisting speed, wind direction, with the real time view registered by the camera into an augmented crane working area view; and
- a display, e.g. a monitor or a head up display, linked to the augmentation system to present the augmented working area view to a crane driver.

In an embodiment, the augmentation system is configured to compensate for heave, more in particular for heel and trim, of a vessel on which the load is located. In an embodiment, the observation system is provided with scanners, for example a camera or a laser scanner, to track the movement of a platform, for example a storage deck, on which the load to be lifted is located, and thus register heave, heel and trim relative to the crane. In an embodiment this information is also used to predict the heave, heel and/or trim pattern.

The information obtained on the changing position of the platform is used by the computerised crane control system to control the movement of the crane, in particular the movement of the load supported by the crane, to thus prevent collision with the platform while lifting the load from the platform and while landing the load on the platform.

In an embodiment, the computerised crane control system is configured to provide active heave compensation, i.e. is configured to keep a load as static as possible compared to the "world coordinate system".

In a further embodiment, the computerised crane control system is configured to provide relative heave compensation, i.e. is configured to keep a load as static as possible compared to a platform, e.g. a storage deck of a supply vessel, onto which the load supported by the crane is to be landed.

The relative heave compensation modus enables to follow an external motion, for example the deck of a supply vessel. Thus, when approaching the supply vessel's deck with a load, the heave compensation will not only compensate for the boom tip motion of the vessel which has the crane mounted, but it can also compensate for the supply vessel's deck motions. This way a much smoother landing on the supply vessel's deck can be ensured.

In an embodiment, the motions of the target platform, e.g. storage deck, are remotely measured using a mobile Motion Reference Unit, to be mounted on the target platform, with secure data link. In addition, or as an alternative, the movement of the target platform is measured by sensors, e.g. a camera or laser, mounted on the crane, for example on the boom of the crane, preferably at the tip of the boom of the crane.

In an embodiment, the registered movement of the target platform is processed real time in the crane's control system. The crane's heave compensation system is set to follow these motions by hauling in or paying out the hoist wire rope. On top of the compensation motion, the crane operator can operate the crane as normally done, to smoothly position the load onto the supply vessel's deck.

In an embodiment, the augmentation system is configured to perform a load hook alignment routine, i.e. is configured to monitor both the position of the load connector and the load to be lifted, preferably at least in a top view, and is configured to, in combination with the computerized crane control system, keep the load connector in a substantially fixed horizontal position relative to the load, in particular prior to the load being lifted from a storage deck of a supply vessel, to thus minimize swinging of the load after lift of by inaccurate crane positioning.

In addition, or as an alternative, the augmentation system is provided with sensors that detect the location of the load connector relative to the boom tip, with sidelead/offlead sensors that monitor the departure angle of the hoisting cable at sheave mounted at the boom structure. In an embodiment, the sensor consists of a device, moveably supported at the tip of the boom, that will follow the movement of the hoisting wire using two small sheaves enclosing the hoisting wire. The position of the device is measured using encoders. The measurement is enhanced with measurements of a motion reference unit that provide information of the orientation of the crane relative to the horizontal plane. When the sidelead exceeds the threshold associated with the selected crane curve, a warning will be generated for the crane driver.

Said hook alignment routine enables the computerized crane control system to adjust the position of the load connector, by controlling the luffing mechanism and/or the hoisting mechanism and/or the slew drive, to keep the offset between the load connector and the load minimal.

In an embodiment, the augmentation system is configured to perform a lift-off routine, i.e. is configured to monitor both the position of the load connector and the load to be lifted, preferably at least in a top view, and is configured to, in combination with the computerized crane control system, keep the load connector in a substantially fixed vertical position relative to the load, in particular prior to the load being lifted from a storage deck of a supply vessel, to thus minimize slag or tension in the hoisting wire at the moment of lift-off.

In an embodiment, the augmentation system is configured to compensate for heave of a vessel on which the load is located. In an embodiment, the observation system is provided with scanners, for example a camera or a laser scanner, to track the vertical movement of a platform, for example a storage deck, on which the load to be lifted is located. Thus, the augmentation system is configured to, in combination with the computerized crane control system, control the hoist winch and provide automatic heave compensation. In addition, the hoisting assembly and/or the computerized crane control system are configured to provide heave compensation once the load connector has been connected to the load, by monitoring the tension hoisting wire.

In a further embodiment, the augmentation system in combination with the computerized crane control system is configured to automatically instigates the lift off, and to time the lift-off with the heave of the vessel on which the load is located.

In such an embodiment, the system predicts the optimal timing for lifting a load. For example, the computerized crane control system and/or the observation system may be configured to perform a lift-off routine. The lift off routine is used to analyse the motion of the vessel on which the crane is mounted and/or the motion of the load to be lifted and/or the motion of the crane relative to the load to be lifted, and based on that information determines the optimal timing for initiating a lifting operation, e.g. from the seabed or a supply vessel. In an embodiment, the optimal timing is when the load is at its maximum height and/or the vertical distance between the boom structure and the load is at a minimum.

The same system can also be used to compensate for heave of the vessel on which the crane is mounted, for example relative to a fixed platform or relative to the sea floor, e.g. when landing an object on the sea floor. The system can also be used to compensate for relative heave between the vessel on which the crane is mounted and a vessel on which the load to be lifted is located.

When the automatic lift-off modes is active, the crane will atomically lift the load to a safe height above the platform when conditions are optimal for a lift-off routine. After that the crane operator can take control and complete the lifting operation. Preferably, the crane driver is indicated by the system, for example with an audible signal, when the lift off is imminent.

In an embodiment, the load connector is provided with audible and/or visual indicators that are activated when auto lift off is imminent. Thus, personnel on deck is made aware the load is about to be lifted from the deck. The indicator are preferably activated by the computerised control system some seconds prior to actual lift off, e.g. 2 or three seconds. In an embodiment, multiple indicators are used to signal subsequent stages in the lift off routine. For example, yellow lights are used to indicate the system is active, i.e. waiting for the correct moment to lift the load, and blinking orange lights if the load is to be lifted within two seconds.

In an embodiment, the augmentation system is configured to present the crane driver with visual information related to the hoisting process.

In an embodiment, the observation system comprises a display that presents the crane driver both with real time camera observations of the crane working area and digital or graphic crane information. Preferably the observation system is configured to project grpaic information over the camera view, thus depicting real time situational information and real time hoisting process information via a single display. In a further preferred embodiment, the graphic crane information is linked to objects registered by the camera, for example to the load connector, to the load or to the storage deck onto which the load is to be landed. Visual markers can be used to provide information on said objects, for example by changing size or colour of said markers. For example, in a top down view of the crane working area, graphic crane information can be provided in the form of a circle that is projected over the load connector, such that the centre of the circle marks the position of the load connector, and the radius of the circle is an indicator of the distance between the load connector and the deck below the load connector.

Examples of crane information that can be projected are: position of the load connector above a deck, preferably presented by a circle with varying radius, a motion vector indicating speed and direction of movement of the load connector, the maxim crane radius at current load, the luffing path, the slewing path, restricted areas, etc.

In an embodiment, the augmentation system comprises spatial information of the vessel and the crane, for example comprises a 3D model of the vessel and the crane, and is configured to use this spatial information to present the crane driver with potential collision objects, e.g. a control station located adjacent the storage deck of the vessel. Also, the spatial information may be combined with functional information, such as areas that are designated 'storage area' and are thus accessible for landing loads, and areas that are designated 'personnel area' and are thus off limits to the crane.

Also, the spatial information can be combined with logistic information, for example to identify different loads stacked on the deck, but also to present the crane driver with information on which load should be handled first or where a particular load should be landed on the deck.

The spatial information can be obtained from a database and/or can be obtained by scanning the surroundings of the crane.

In an embodiment, the augmentation system is configured to continuously scan at least the working area of the crane, preferably the surroundings of the crane, to obtain spatial information on temporarily objects, such as containers stacked on the storage deck of the vessel.

In an embodiment, the observation system comprises a scanning device for scanning the working area and an area directly adjacent the working area, to obtain real time 3D area information. In an embodiment, a camera and object recognition software are used, in addition, or as an alternative, a spatial sensor such as a laser scanner is used to register spatial information of the working area.

In an embodiment, the observation system comprises one or more spatial sensors, for example laser scanners or ultrasonic scanners, to register, preferably continuously register, the surroundings of the crane. Thus, the spatial information available to the augmentation system can be updated. Changes in the environment, for example due to stacking objects on the storage deck, can be incorporated in the augmented view.

The spatial sensors can be located on the crane. In an embodiment, the sensors are located on the super structure of the crane and/or the boom of the crane, such that the area scanned by the sensors moves with the crane when the latter is slewed by the slew drive. In an embodiment, the sensors can be mounted on the vessel, for example along different positions along a storage deck, to provide spatial information of an area from different angles. This is in particular beneficial when the area comprises fixed or temporarily obstacles, such as containers stacked on the storage deck. For example, in an embodiment, the vessel is provided with multiple sonar sensors to register container positions on the storage deck from several angles.

In addition, or as an alternative, one or more spatial sensors can be mounted on the boom of the crane, e.g. at the top of the boom, to provide a top down view of the crane working area. In an embodiment, the load connector can be provided with sensors and/or camera's to scan the crane working area and/or provide information, e.g. a real time top down view of the working area, to the crane driver.

In an embedment, mobile sensors are temporarily mounted to the load itself, for example to a container, to register the surroundings of the container, and for example the proximity of other objects and/or the load connector, or to register the location of the load relative to the spatial information present in the augmentation system. In an embodiment, the augmented view displays the position of the load connector relative to the boom, more in particular relative to the position at which the hoisting cable is supported by the boom. Thus, the augmented view may in a top view of the crane working area indicate the side lead and/or the offlead of the load connector. In an embodiment, the augmented view may show the crane operator information on the speed of the load connector and the position of the load connector relative to the storage deck or relative to a load located on the storage deck.

Also, sensors can be incorporated in the working deck, for example to subdivide the storage deck in multiple storage areas and register of an object is present or not at these storage areas. In addition, or as an alternative, the storage deck may be provided with markers that optimally register on sensors mounted on the crane, to thus enhance the spatial registration of the working deck by said sensors.

In an embodiment, the augmented view displays the distance between the load connector, and/or the load supported by the load connector, and the crane drivers cabin, or, in case of a top down view of the working area, the distance between the top of the boom and the load connector, and/or the load supported by the load connector.

In an embodiment, the augmentation system is configured to project a path for the crane driver to follow the hoisted load, to safely transfer the load to its stacking location. In an embodiment, the crane driver enters a start location and an end location, and the computerized crane control system or the augmentation system generates the optimal path between those locations. In an alternative embodiment, the augmentation system comprises logistic information on the load to be hoisted, and thus knows the start and/or end location, and generates path based on that information when the crane driver selects the load to be hoisted.

The path can for example be projected in the form of three dimensional line which is to be followed with the hoisted load, or in the form of a virtual tunnel, marked by subsequent rectangular frames, the tunnel defining the boundaries within which the load should be kept to obtain an optimal transfer from one location to the other.

In a further embodiment, the computerized crane control system linked to the slew drive, the luffing drive, and the hoisting winch, and computerized crane control system is configured to automatically hoist a load along a pre-programmed path, the path being generated by the augmentation system, the computerized crane control system or the crane driver.

In an embodiment, the augmentation system is configured to display both the position of the load connector and the path to be followed, preferably at least in a top view, such that the augmented view displays the difference between the path and the position of the load connector, and thus the side lead and/or the offlead of the load connector relative to the path. This allows the crane driver to adjust the position of the load connector, by controlling the luffing mechanism and/or the hoisting mechanism and/or the slew drive, to keep the offset between the path and the actual load minimal. In a further embodiment, the computerised crane control system is configured to make the adjustments to thus automatically keep the load on the pre-set trajectory.

According to an eighth aspect, the invention furthermore provides an offshore vessel comprising a crane, the craning having a computerized crane control system linked to a slew drive, a luffing drive and a hoisting winch of the crane, which computerised crane control system is configured to allow the crane driver to enter a desired position of the load connector by entering xyz-coordinates. Thus, the crane driver controls directly the XYZ-motion of the load connector instead of controlling the hoisting, luffing and slewing motion of the crane. The control system translates the operator commands to the correct motion of hoist, luffing and slew system taking the limitations of the crane into account.

Entering the desired coordinates of the load connector is particularly useful when the load has to be positioned quite accurately or when the crane is operated using a remote control box. For example, the crane driver can use a remote control box for controlling the crane while standing on the storage deck of the vessel.

In an embodiment, the control system ensures that acceleration and deceleration of the load remains linear independent of the position of the crane. Furthermore, the acceleration rate is adjusted to stay within the capabilities of the crane in that position. Preferably, the crane driver can also control the hoisting, luffing and slewing motion of the crane directly, if desired.

In an embodiment, the system allows for the crane driver to enter an area of the storage deck into the computerised crane control system, and the crane positions the load connector above said area, after which the crane driver controls lowering the load connector. The deck is for example subdivided in a grid like lay out, allowing the crane driver to position the load connector above for example area A2 or D5. In a further embodiment, the crane driver is also allowed to enter the height at which the load connector should be positioned above the deck at said location.

The invention furthermore provides and offshore wind turbine installation vessel, the vessel comprising:
  a hull having a storage deck configured for storage thereon of one or more wind turbine foundation piles, e.g. monopiles, in horizontal orientation thereof, said foundation piles each having a lower end configured to be driven into the seabed and a top end,
  a crane comprising:
    a crane base secured to the hull,
    a slewable superstructure mounted on the crane base and slewable about a vertical slew axis relative to the crane base,
    a slew drive configured to cause slew motion of the superstructure about the slew axis,
    a boom structure comprising a boom that is pivotally connected to the superstructure about an inner pivot axis,
    a luffing mechanism comprising a luffing drive and configured to cause luffing motion of the boom structure,
    a hoisting assembly comprising a hoisting winch and a hoisting winch driven cable,
    a load connector, wherein the winch driven cable extends in a multi-fall arrangement between a sheave set on the boom structure and a sheave set on the load connector,
    a computerized crane control system linked to the slew drive, the luffing drive, and the hoisting winch, which computerized crane control system is programmed to perform a foundation pile installation routine providing a coordinated pattern of slew motion of the superstructure and of luffing motion of the boom structure, as well as operation of the hoisting winch so that the load connector moves from a foundation pile pick up position thereof where the load connector is connected to the top end of a horizontally oriented foundation pile stored on the deck to a foundation pile overboarding position thereof wherein the foundation pile is in vertical suspended from the load connector, outside of the hull, and preferably is aligned with a pile gripper configured to maintain the wind turbine foundation pile in vertical orientation during a pile driving operation wherein the foundation pile is driven into the seabed.

It is a further object of the invention to provide an improved crane, preferably a crane for use on an off shore vessel. The invention therefore provides a crane
  a crane comprising:
    a crane base secured to the hull,
    a slewable superstructure mounted on the crane base and slewable about a vertical slew axis relative to the crane base,
    a slew drive configured to cause slew motion of the superstructure about the slew axis,
    a boom structure comprising a boom that is pivotally connected to the superstructure about an inner pivot axis,
    a luffing mechanism comprising a luffing drive and configured to cause luffing motion of the boom structure,
    a hoisting assembly comprising a hoisting winch and a hoisting winch driven cable,
    a load connector, wherein the winch driven cable extends between a sheave on the boom structure and the load connector,
    a computerized crane control system linked to the slew drive, the luffing drive, and the hoisting winch, which computerized crane control system is programmed to perform a routine providing a coordinated pattern of slew motion of the superstructure and of luffing motion of the boom structure, as well as operation of the hoisting winch,
  wherein the computerized crane control system preferably is programmed to perform:
    an auto hook height routine, which auto hook height routine comprises, during a luffing of the boom structure, driving the hoisting winch to keep the vertical distance between the load connector and the boom structure, more in particular the sheave on the boom structure, substantially constant, such that effectively, during the luffing of the boom the load connector is moved with the boom structure
    and/or a level hook height routine, which level hook height routine comprises, during a luffing of the boom structure, driving the hoisting winch to keep the vertical distance between the load connector and the storage deck of the vessel substantially constant, such that effectively, during the luffing of the boom the load connector, and a load supported by that load connector, is kept at a constant height,
  and wherein the crane further preferably comprises:
    an input device, linked to the computerized crane control system, which is configured to receive a command to start the load hoisting routine of the computerized crane control system.

and/or a collision prevention system, comprising multiple proximity detectors, e.g. camera's with object recognition software or laser scanners, which proximity detectors are located along at least a top section of the boom structure to scan a collision safety zone extending adjacent at least the top section of the boom structure, to detect an object entering the collision safety zone during a slew motion and/or a luffing motion and to subsequently present a crane driver with a warning signal and/or stop the slew motion and/or luffing motion of the boom to prevent a collision with the detected object.

From the foregoing, it will be clear to the skilled person, that the different aspects of the invention described above, or any of the technical features comprised therein, may be combined with any of the either alone or in any other technically possible combination with one or more of the other aspects of the invention disclosed.

The examples described above are presented with reference to providing an offshore vessel comprising a crane, or a crane for providing such a vessel. However, as will be understood by one skilled in the art, the devices and techniques described herein may be applied to provide cranes, e.g. mast cranes, around the leg cranes, knuckle boom cranes, for any suitable offshore vessel, e.g. a jack-up vessel, a drilling vessel, a semisubmersible, etc.

Furthermore, some aspects of the invention may also be used with surface based cranes, for example harbour cranes, building cranes, etc.

Advantageous embodiments of a vessel according to the invention and a method according to the invention are disclosed in the sub claims and in the description, in which the invention is further illustrated and elucidated on the basis of a number of exemplary embodiments, of which some are shown in the schematic drawing. In the figures, components corresponding in terms or construction and/or function are provided with the same last two digits of the reference numbers.

Whilst primarily presented for illustrative purposes with reference to one or more of the figures, any of the technical features addressed below may be combined with any of the independent claims of this application either alone or in any other technically possible combination with one or more other technical features.

In the figures.

Figure 8:
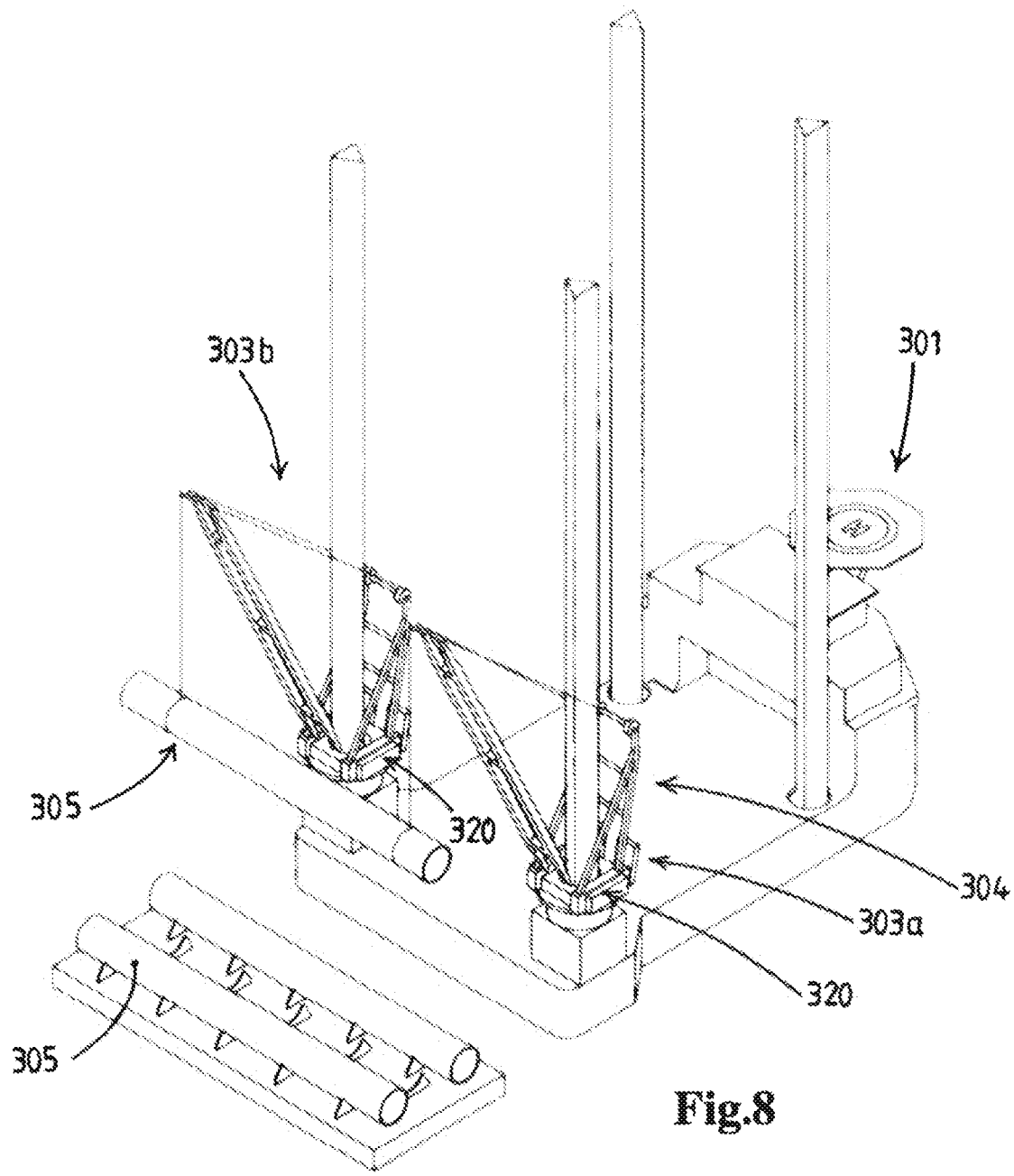

FIG. 8 shows a perspective view of a jack up vessel according to the invention, the vessel comprising a first crane and a second crane, the first crane and the second crane hoisting a pile onto the storage deck of the vessel using a hoisting routine to control the movements of the cranes; and FIG. 9 shows a side view of a jack up vessel according to the invention, the vessel comprising a first crane and a second crane, the first crane and the second crane hoisting a top structure onto the storage deck of the vessel using a hoisting routine to control the movements of the cranes.

Figure 1:
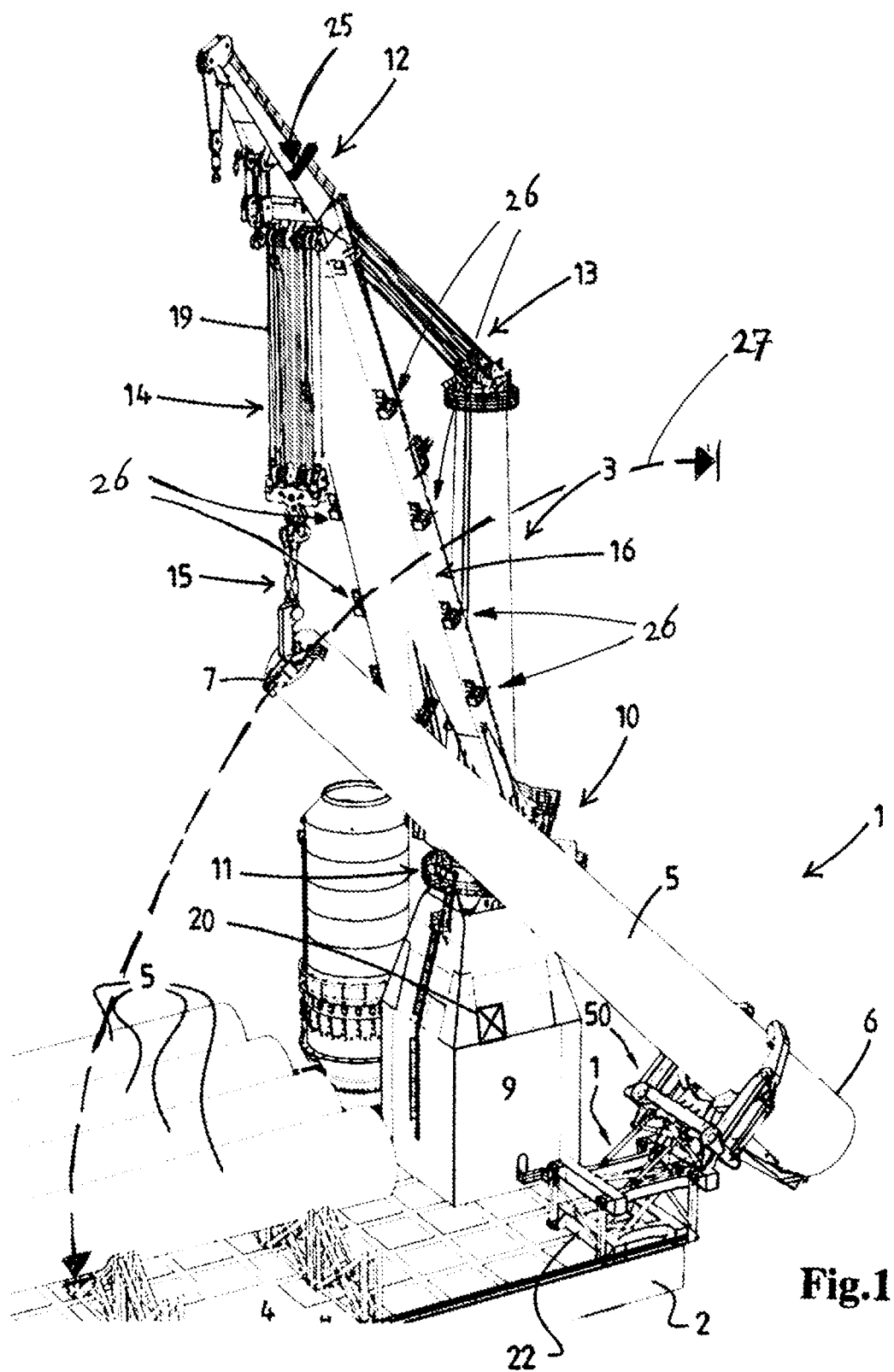
FIG. 1 shows a perspective view of an offshore wind turbine installation vessel according to the invention during a pile upending routine, the vessel comprising a crane and further comprising a pile holding system, for supporting a pile in a horizontal position, the pile holding system comprising a pile gripper for positioning the pile when in a vertical orientation.

FIG. 1 depicts an offshore wind turbine installation vessel 1 according to the invention. The vessel comprises a hull 2 and a crane 3. In the particular embodiment shown, the vessel is furthermore provided with a pile gripper 22, which pile gripper also functions as an upending cradle. More in particular, the pile gripper also functions as a pile holder, i.e. is configured to engage a circumference of the pile at a lower side thereof and to hold the pile in order to limit movement of the lower side of the pile in a direction perpendicular to a longitudinal axis of the pile.

The hull 2 is provided with a storage deck 4 configured for storage thereon of one or more wind turbine foundation piles 5, e.g. monopiles, in horizontal orientation thereof. The foundation piles 5 each having a lower end 6, configured to be driven into the seabed, and a top end 7.

The crane 8 comprises a crane base 9, which crane base 9 is secured to the hull 2, and a slewable superstructure 10 mounted on the crane base 9, and slewable about a vertical slew axis relative to the crane base.

The crane 8 further comprises a slew drive 11, a boom structure 12, a luffing mechanism 13, a hoisting assembly 14 and a load connector 15.

The slew drive 11 is configured to cause slew motion of the superstructure 10 about the slew axis.

The boom structure 12 comprises a boom 16 that is pivotably connected to the superstructure 10, such that it can pivot about a horizontal inner pivot axis.

The luffing mechanism 13 comprising a luffing drive 17 and is configured to cause a luffing motion of the boom structure 12. Thus, the luffing mechanism can be used to pivot the boom upwards or downwards.

The hoisting assembly 14 comprises a hoisting winch 18 and a hoisting winch driven cable 19. In the embodiment shown, the winch driven cable 19 extends in a multi-fall arrangement between a sheave set on the boom structure 12 and a sheave set on the load connector 15.

According to the invention, the crane 2 comprises a computerized crane control system 20 linked to the slew drive 11, the luffing drive 17, and the hoisting winch 18.

The computerized crane control system 20 is programmed to perform a foundation pile installation routine providing a coordinated pattern of slew motion of the superstructure 10 and of luffing motion of the boom structure 12, as well as operation of the hoisting winch 18 so that the load connector 15 moves from a foundation pile pick up position 21 thereof, in which the load connector 15 is connected to the top end 7 of a horizontally oriented foundation pile 5 stored on the storage deck 4, to a foundation pile overboarding position thereof, in which the foundation pile 5 is in vertical position suspended from the load connector 15, outside of the hull 2.

Figure 2:
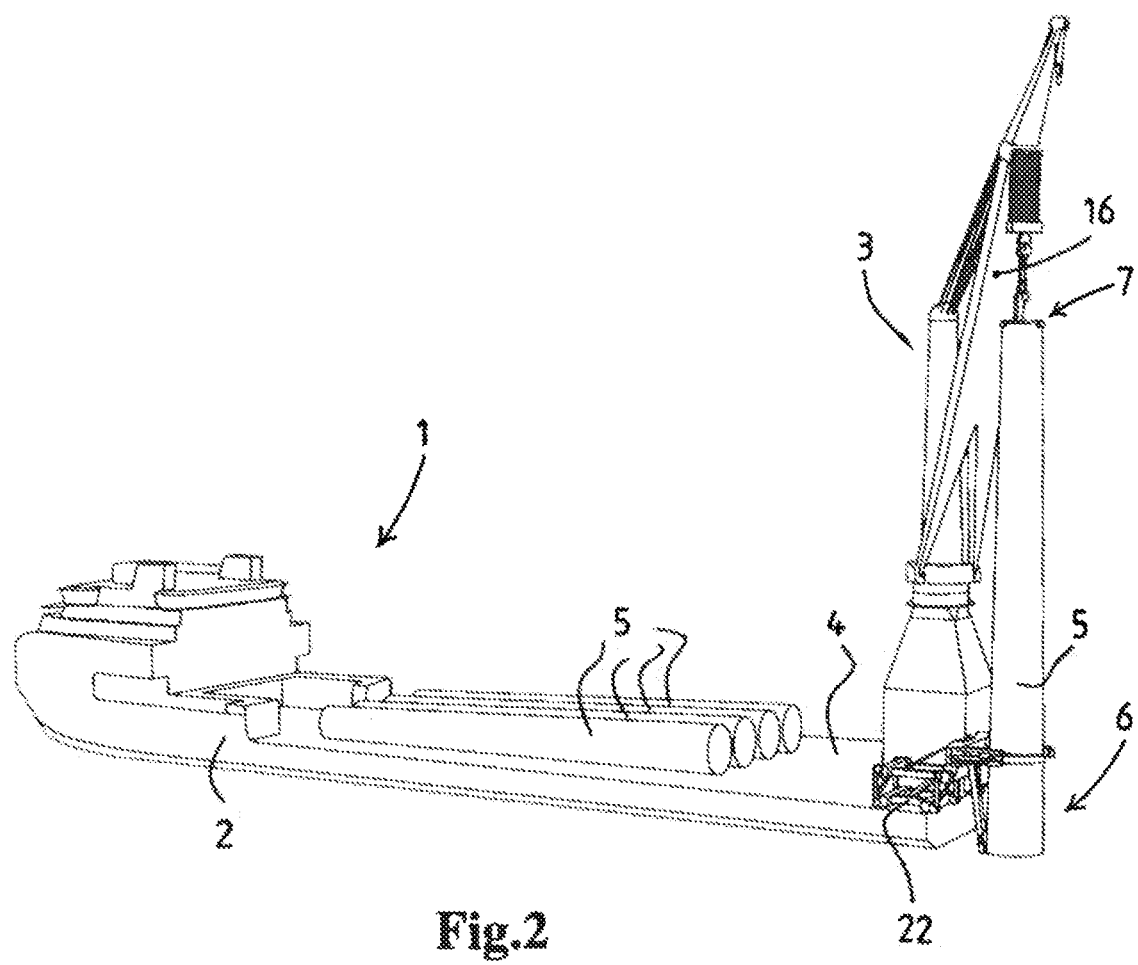
FIG. 2 shows a perspective view of the vessel of FIG. 1, with the pile has been lifted into a substantially vertical orientation.

In the particular embodiment shown, the foundation pile, when supported in the foundation pile overboarding position, is aligned with the pile gripper 22. This position is depicted in FIG. 2. The pile gripper 22 is configured to maintain the wind turbine foundation pile in vertical orientation during a pile driving operation wherein the foundation pile is driven into the seabed.

In the embodiment shown, the upending cradle is configured to travel across the deck to engage the bottom end of a pile supported on the support deck of the vessel. Subsequently, the top end of the pile is lifted slightly by the crane. Then, the cradle can move back towards the edge of the deck, while the crane moves to top end of the pile, such that the pile is kept in a substantially horizontal position. Once the upending cradle is positioned adjacent the edge of the deck, as shown in FIG. 1 and FIG. 2, the upending routine can be started.

It is submitted that the movement by the crane of the top end of the pile while the upending cradle is moved to the edge of the deck requires a slewing movement, a luffing movement and possibly a hoisting movement. It is difficult to control the crane such that the top end of the pile does not significantly change in height, which might cause the op end or the bottom end of the pile to contact the deck of the vessel and potentially damaging it, or deviates towards the left or right, which might put a strain on the upending cradle and potentially damaging it. Therefore, this hoisting routing is preferably also performed by the computerized crane control system.

The offshore wind turbine installation vessel 1 enables a method for installation of a pile adapted to support an offshore wind turbine, according to the invention.

The method comprising the following steps:

a. transporting a pile, preferably on the installation vessel, in a horizontal orientation to an offshore installation site;

b. positioning the pile in a pile holder on an installation vessel while being in a horizontal orientation parallel to a longitudinal axis of the vessel, wherein the pile holder engages with a circumference of the pile at a lower side thereof to hold the pile in order to limit movement of the lower side of the pile in a direction perpendicular to a longitudinal axis of the pile, and wherein the pile holder engages with a lower end of the pile in order to limit movement of the pile in a direction parallel to the longitudinal axis of the pile;

c. using the computerised crane control system to move the load connector along a predefined trajectory 27, and thus lifting an upper end portion of the pile, with the lower side of the pile in the pile holder, thereby rotating the pile from a horizontal orientation to a vertical orientation about a substantially horizontal rotation axis perpendicular to the longitudinal axis of the vessel, which is shown in FIG. 1;

after rotating the pile from the horizontal orientation to the vertical orientation, the pile being located outside the contour of the vessel, when seen from above, to be lowered into the water, which is shown in FIG. 2;

d. lowering the pile into the water while being held by the pile holder. Thus, the pile holder also functions as a pile gripper.

With the vessel 1 depicted in FIG. 1, step c and step d are performed by the computerised crane control system of the vessel 1. The vessel furthermore is also able to carry out step a and step b.

It is submitted that in the embodiment shown in FIG. 1 and FIG. 2, the vessel 1 is provided with a pile upending system. The pile upending system comprises the crane 8 and the upending cradle 22. The upending cradle functions as a pile holder and as a pile gripper.

The pile holder, more in particular the upending cradle 22, is mounted on the vessel, and is configured to engage a circumference of the pile at a lower side thereof and to hold the pile in order to limit movement of the lower side of the pile in a direction perpendicular to a longitudinal axis of the pile. Thus the pile holder engages a lower end of the pile in order to limit movement of the pile in a direction parallel to the longitudinal axis of the pile. In FIG. 1, the cradle functions as a pile holder, i.e. to position the pile during the upending process. In FIG. 2, the cradle functions as a pile gripper, i.e. to position the pile during the lowering process. To enable the pile holder, more in particular the upending cradle, to function as a pile gripper, the pile holder should be able to engage the pile in an outboard position, i.e. outside the contour of the vessel, when seen in top view.

Thus, the upending cradle allows for lifting an upper end portion of a pile, of which pile the lower side is engaged by the cradle in its function as pile holder, to thereby rotate the pile from a horizontal orientation to a vertical orientation about a substantially horizontal rotation axis.

In the embodiment shown, the upending cradle 22 comprises a pivotably supported clamp, to secure the bottom section of the pile relative to an upending pivot axis, and the computerised crane control system 20 is configured to measure the angle of the clamp and use this information in controlling the trajectory of the load connector. Preferably, the computerised crane control system is provided with one or more sensors, and/or is linked to one or more sensors provided on the pivotable support clamp, which sensors monitor the angle of the pivotable support clamp, and thus monitor the angle relative to the horizontal of the pile supported by the clamp. Thus, this information on the angle of the pile can be used to control, for example adjust, the predefined trajectory of the load connector.

In addition, or as an alternative, the computerised crane control system comprises one or more sensors that monitor the force exerted by the pile onto the cradle and/or by the cradle onto the deck of the vessel. For example, the during the hoisting process, the movement of the load connector in the upward direction may be too fast compared to the movement towards the cradle, causing a the cradle to be pulled towards the load connector. The movement of the load connector can be adjusted to keep the pulling force minimal, preferably clause to zero.

In the embodiment shown, the crane 3 is a mast crane, and is mounted in line with the central axis of the vessel. In a further embodiment, for example shown in FIGS. 3-7, a vessel comprises two similar cranes, both provided with a computerized crane control system, one crane located along the portside and one crane located along the starboard side of the vessel.

Figure 3:
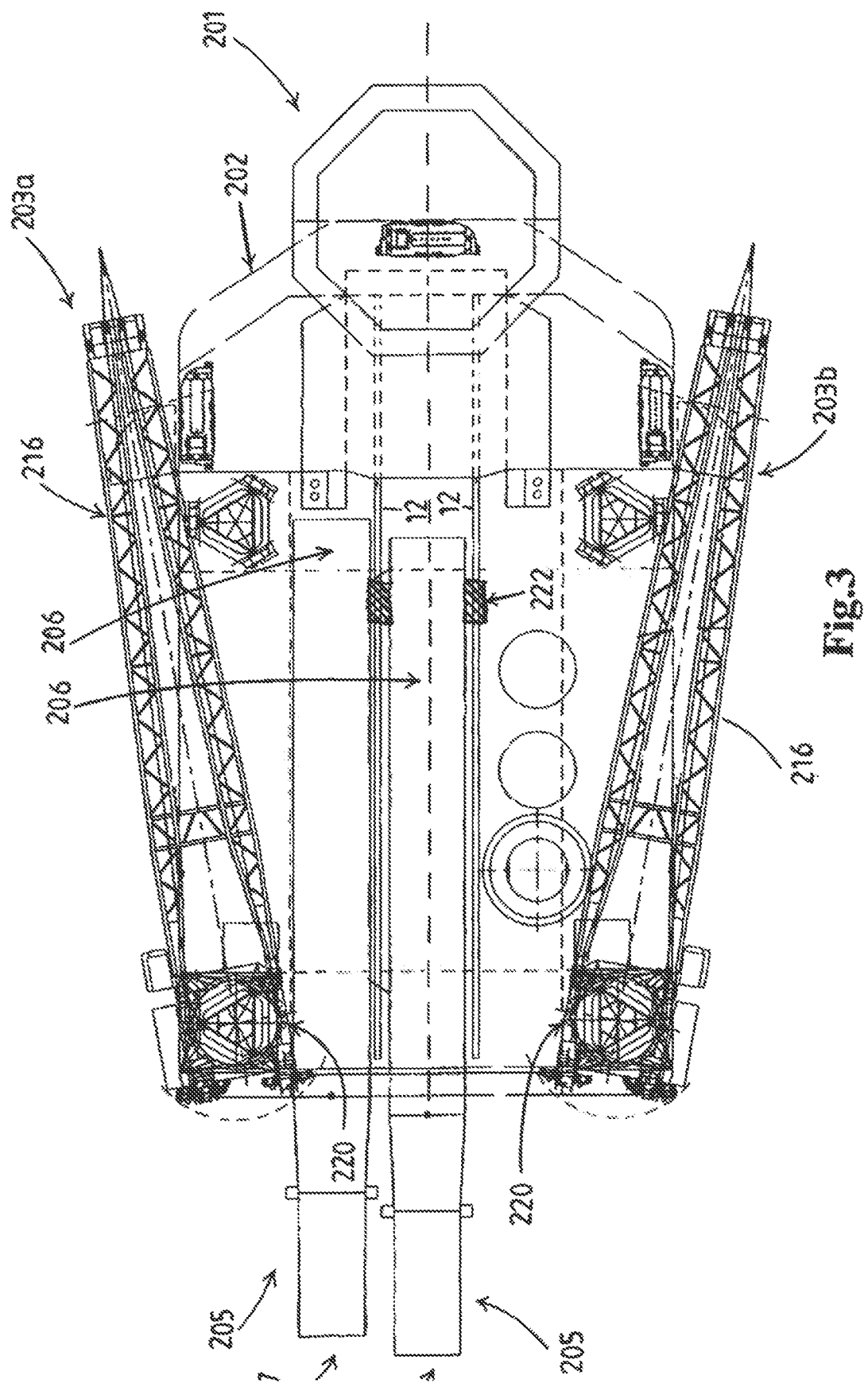
FIG. 3 shows a top view of an offshore wind turbine installation vessel according to the invention, the vessel comprising a first crane and a second crane, the vessel further comprising an upending cradle moveably supported on a cradle track.

FIG. 3 shows a top view of an offshore wind turbine installation vessel 101 according to the invention, the vessel comprising a first crane 103a and a second crane 103b, the vessel 101 further comprising an upending cradle 122 moveably supported on a cradle track 123.

The second crane 103b is similar to the first crane 103a. The computerized crane control system of the first crane 103a is linked to a slew drive, a luffing drive, and a hoisting winch of the second crane. The computerized crane control system is programmed to perform the foundation pile installation routine providing a coordinated pattern of slew motion of the superstructure and of luffing motion of the boom structure, as well as operation of the hoisting winch of both the first crane and the second crane so that the load connector of the first crane and the load connector of the second crane each move from a foundation pile pick up position thereof, where the load connector is connected to a horizontally oriented foundation pile stored on the deck, to a foundation pile upended position thereof, wherein the foundation pile is in vertical position and is suspended by both the first crane and the second crane.

Figure 4:
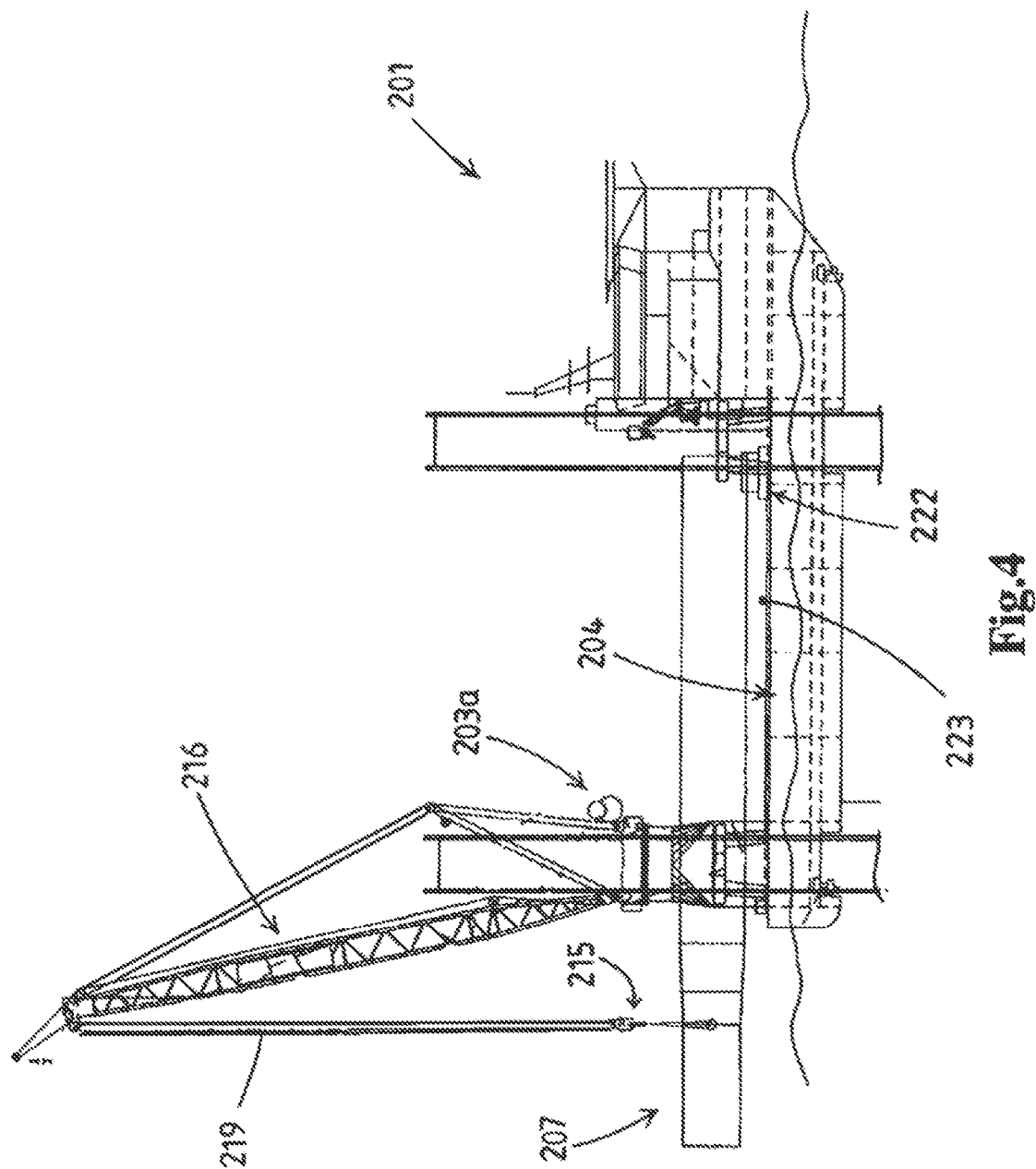
FIG. 4 shows a side view of the vessel of FIG. 3 at the start of a pile installation routine.

FIG. 4 shows a side view of the vessel 101 of FIG. 3 at the start of a pile installation routine.

Figure 5:
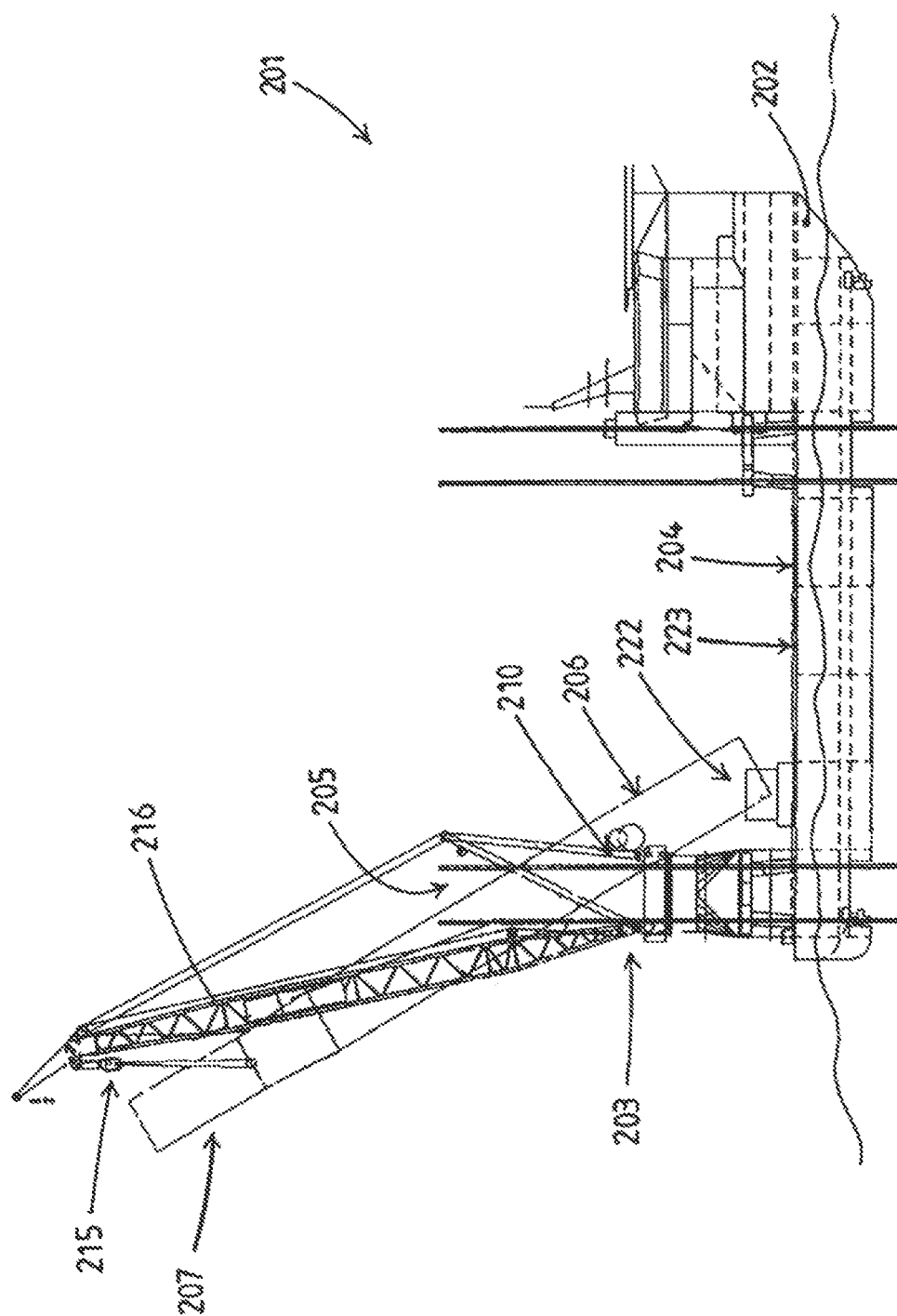
FIG. 5 shows a side view of the vessel of FIG. 3 during the pile installation routine.

FIG. 5 shows a side view of the vessel 101 of FIG. 3 during the pile installation routine.

Figure 6:
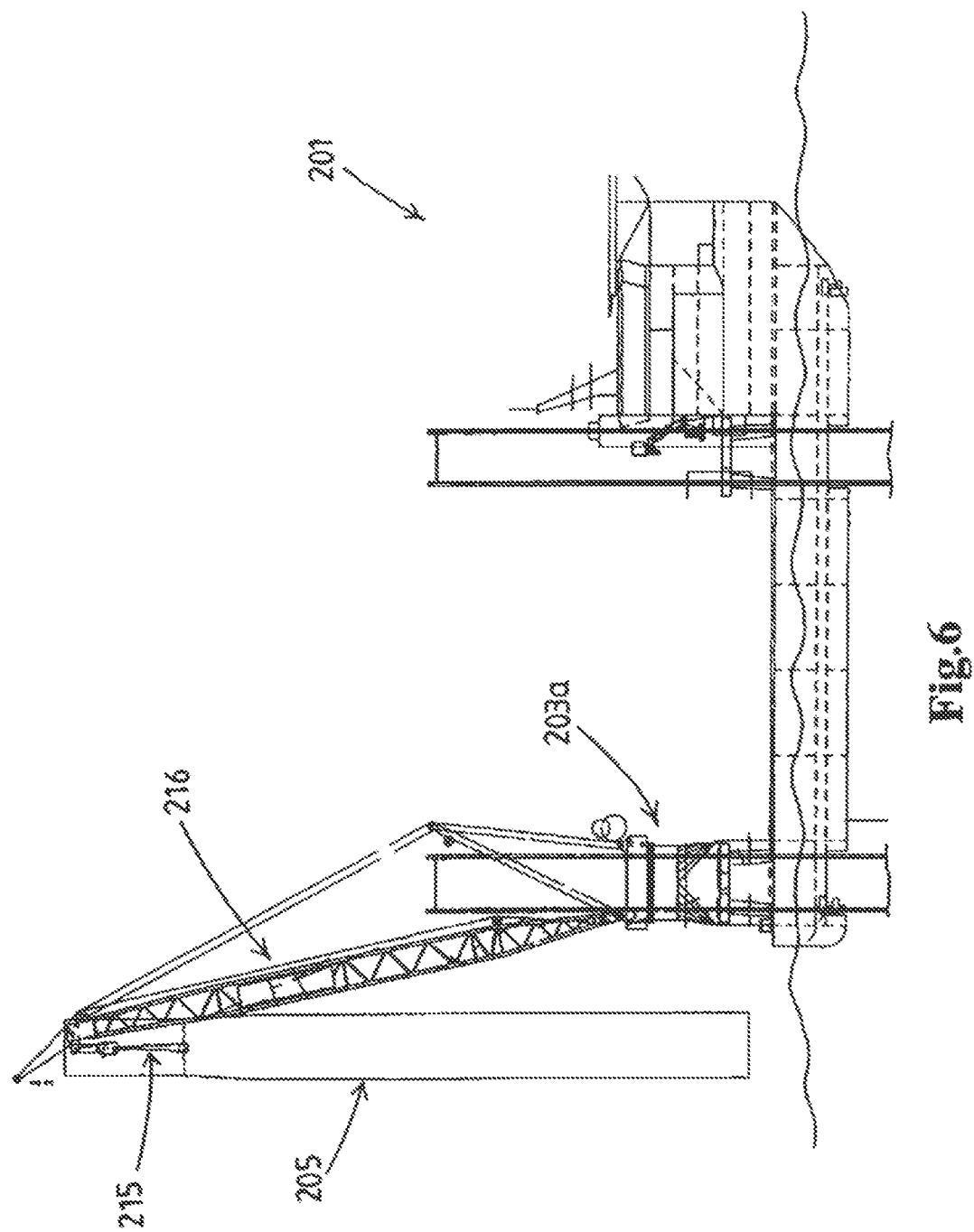
FIG. 6 shows a side view of the vessel of FIG. 3 at the end of the pile installation routine.

FIG. 6 shows a side view of the vessel 101 of FIG. 3 at the end of the pile installation routine.

Figure 7:
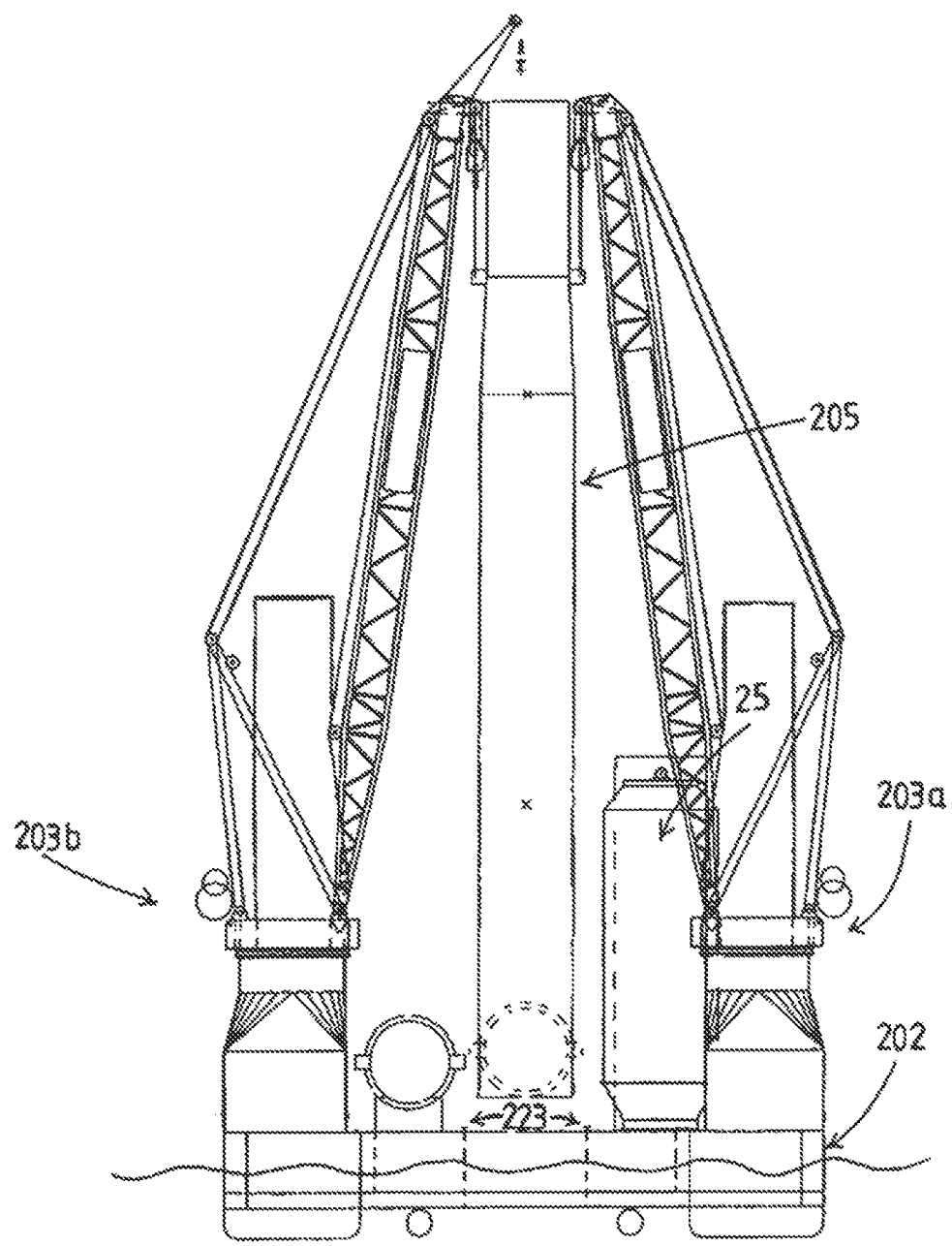
FIG. 7 shows a rear view of the vessel of FIG. 3 at the end of the pile installation routine.

FIG. 7 shows a rear view of the vessel 101 of FIG. 3 at the end of the pile installation routine.

In an embodiment, the vessel 201 is provided with an upending cradle track 200. The cradle track comprises two rails 12. The upending cradle 222 is mounted on the cradle track and is configured to move along a track, during the upending of the foundation pile. By thus moving the cradle 222, the top end of the pile 205 can be lifted in a purely vertical direction, which facilitates the lifting process. It is to be noted that in the embodiment shown, the length of the pile is such that the tope end, i.e. the end that has to be engaged by the hoisting devices of the first crane and the second crane, extends outside the contour of the vessel. Thus the cradle track does not extend up to the position at which the cranes engage the pile. Therefore, only during the first part of the upending process, the cranes can lift the top end in the vertical direction, while the bottom end of the pile is skidded towards the cranes by the upending cradle moving along the cradle track.

In the embodiment shown, the position of the upending cradle is tracked by the computerised crane control system. Thus, the installation routine run by the crane control system can be used to adjust the hoisting speed such that it keeps up with the movement of the upending cradle along the track. In an embodiment, the cradle is provided with a drive, for enabling controlled movement of the cradle along the track, and the computerized crane control system is configured to at least monitor the movement of the cradle, preferably control the drive and thus control the movement of the cradle along the track.

In an embodiment, the vessel, preferably the crane of the vessel, further comprises an observation system linked to the computerized crane control system, for tracking movement of the load connector and/or the top end of the wind turbine foundation piles during the foundation pile installation routine, which observation system comprises:
  at least one camera, preferably mounted to the boom, to register a crane working area view, preferably a crane working area top view, of the working area of the crane,
  an augmentation system, linked with the at least one camera and with the crane control system, and configured to combine graphic crane information, e.g. hoisting speed, wind direction, with the real time view registered by the camera into an augmented crane working area view; and
  a display, e.g. a monitor or a head up display, linked to the augmentation system to present the augmented working area view to a crane driver.

The observation system enables the crane driver to monitor the movement of the load connector, and thus the load supported thereby. In a preferred embodiment, the display projects the programmed trajectory of the load connector according to the installation routine and the actual position, preferably the actual trajectory, of the load connector to facilitate monitoring the routine by the crane driver. The crane driver may stop or overrule the routine if the discrepancy between the actual track and the predetermined track becomes too large.

In a further preferred embodiment, the computerized crane control system allows for the crane driver to adjust the routine to keep the load connector on track, without having to stop the routine.

In an embodiment, the crane driver is allowed to move the load connector towards or away of a predefined trajectory, for example by using a joystick to adjust the position of the load connector relative to the predefined trajectory in a horizontal plane and a handle to adjust the positon of the load connector relative to the predefined trajectory in the vertical direction.

The crane show in FIG. 1 and FIG. 2, furthermore comprises an observation system comprising an augmentation system according to a third aspect of the invention.

The observation system comprises a camera 25 mounted to the boom of the crane, to register a crane working area top view, of a working area of the crane, The observation system further comprises an augmentation system and a display.

The augmentation system is linked with the camera and with the crane control system, and is configured to combine graphic crane information, e.g. hoisting speed, wind direction, with the real time view registered by the camera into an augmented crane working area view.

The display, e.g. a monitor or a head up display, is linked to the augmentation system to present the augmented working area view to a crane driver. The display is preferably provided in the crane driver cabin, or on a mobile device for controlling the crane for example while standing on the deck.

Thus, the crane provides a crane driver with a real time overview of the crane working area, which view is alternative to the direct view of the crane driver. In addition, a top view of the crane working area provides visual information on objects set up next to each other, which are not visible in the direct view of the crane driver.

Furthermore, the overview combines a digital representation and/or actual picture of the crane working area, combined with graphic crane information. The term 'crane information" may refer to any type of information relevant to the hoisting process, and may comprise information on the load to be lifted, on the vessel on which the load is located, wind direction, logistic planning information, etc.

In an embodiment, the augmentation system comprises spatial information of the vessel and the crane, for example comprises a 3D model of the vessel and the crane, and is configured to use this spatial information to present the crane driver with potential collision objects, e.g. a control station located adjacent the storage deck of the vessel. Also, the spatial information may be combined with functional information, such as areas that are designated 'storage area' and are thus accessible for landing loads, and areas that are designated 'personnel area' and are thus off limits to the crane.

Also, the spatial information can be combined with logistic information, for example to identify different loads stacked on the deck, but also to present the crane driver with information on which load should be handled first or where a particular load should be landed on the deck.

In the embodiment shown, the observation system comprises multiple spatial sensors 26, in the embodiment shown laser scanners, to register the surroundings of the crane. Thus, the spatial information available to the augmentation system can be updated. Changes in the environment, for example due to stacking objects on the storage deck, can be incorporated in the augmented view.

The spatial sensors are located on the boom of the crane, such that the area scanned by the sensors moves with the crane when the latter is slewed by the slew drive. In an embodiment, additional sensors can be mounted on the vessel, for example along different positions along a storage deck, to provide spatial information of an area from different angles. In an embodiment, the load connector is provided with sensors and/or camera's to scan the crane working area and/or provide information, e.g. a real time top down view of the working area, to the crane driver.

In an embodiment, the observation system comprises a camera and optical recognition software, to monitor presence of personnel in the crane working area, and the augmentation system is configured to signal and indicate the presence of personal in the crane working area to the crane driver. In an embodiment, the personnel device, e.g. rfid tags or reflectors on a helmet or jacket, to optimize tracking of the load connector by the camera and/or sensors of the computerized crane control system.

In a further embodiment, the observation system is linked to the computerized crane control system, and the latter is configured to stop the movement, or adjust the trajectory, of the load connector to prevent a collision from occurring or to prevent a load from being moved in a position above, or within a predetermined range of, personal personnel detected by the observation system.

Furthermore, in the embodiment shown, the crane is provide with a collision prevention system. The system comprises multiple proximity detectors, in the embodiment shown the spatial sensors 26 that are also used to update the spatial information available to the augmentation system to provide the augmented system with a real time representation of the surroundings of the crane. In an alternative embodiment, as an alternative or as a back up, to the spatial sensors, the collision prevention system is provided with simple proximity detector devices.

The proximity detectors are located along the boom structure to scan a collision safety zone extending adjacent the boom structure, to detect an object entering the collision safety zone during a slew motion and/or a luffing motion and to subsequently present a crane driver with a warning signal and/or stop the slew motion and/or luffing motion of the boom to prevent a collision with the detected object.

By providing crane with a collision prevention system, the invention allows for simplifying crane operation. Furthermore, the collision prevention system is particularly beneficial when performing crane operations under conditions with poor visibilities, for example at night, or with severe weather conditions, such as rain, fog or snow.

Preferably, the data obtained by the proximity detectors is graphically presented to the crane driver, for example on a display in the operator cabin. In addition, if the crane boom enters a dangerous zone, an audible alarm and/or visual alarm will be activated.

It is submitted that the invention is not limited to up-ending a pile. In an embodiment, a crane comprising a computerized crane control system according to the invention can also be used for transporting a load other than a pile, such as for example a container, along a predefined trajectory from one location to another location, for example from a supply vessel onto a rig.

It is submitted that the first aspect of the invention, in particular the crane according to the first aspect of the invention, can also be used in lifting piles or mast sections that have been transported to the installation site in an upended position.

FIG. 8 shows a perspective view of a jack up vessel 201 according to the invention, the vessel 201 comprising a first crane 203a and a second crane 203b, the first crane 203a and the second crane 203b hoisting a pile 205 onto the storage deck 204 of the vessel 201 using a routine, more in particular a hoisting routine, to control the movements of the cranes 203a, 203b FIG. 9 shows a side view of a jack up vessel 201 according to the invention, the vessel 201 comprising a first crane 203a and a second crane 203b, the first crane 203a and the second crane 203b hoisting a top structure 24 onto the storage deck 204 of the vessel 201 using a routine, more in particular a hoisting routine to control the movements of the cranes 203a, 203b.

The invention claimed is:

1. An offshore wind turbine installation vessel comprising:
 a hull having a storage deck, wherein the storage deck is configured for storage thereon of one or more wind turbine foundation piles in horizontal orientation thereof, said foundation piles each having a lower end configured to be driven into the seabed and a top end; and
 a crane comprising:
  a crane base secured to the hull;
  a slewable superstructure mounted on the crane base and slewable about a vertical slew axis relative to the crane base;
  a slew drive configured to cause slew motion of the superstructure about the slew axis;
  a boom structure comprising a boom that is pivotally connected to the superstructure about an inner pivot axis;
  a luffing mechanism comprising a luffing drive and configured to cause luffing motion of the boom structure;
  a hoisting assembly comprising a hoisting winch and a hoisting winch driven cable;
  a load connector, wherein the winch driven cable extends in a multi-fall arrangement between a sheave set on the boom structure and a sheave set on the load connector;
  a pile holder having an upending cradle; and
  a computerized crane control system linked to the slew drive, the luffing drive, and the hoisting winch, the computerized crane control system being programmed to perform a routine providing a coordinated pattern of slew motion of the superstructure and of luffing motion of the boom structure, as well as operation of the hoisting winch, so that the load connector moves along a predefined trajectory,
 wherein the computerized crane control system is programmed to perform a foundation pile installation routine providing the coordinated pattern of slew motion of the superstructure and of luffing motion of the boom structure, as well as operation of the hoisting winch so that the load connector moves from a foundation pile pick up position thereof, wherein the load connector is connected to the top end of a horizontally oriented foundation pile stored on the deck, to a foundation pile overboarding position thereof, and wherein the foundation pile is vertical suspended from the load connector, outside of the hull,
 wherein the upending cradle is configured to support the lower end or a lower section of the foundation pile during upending of the foundation pile during the foundation pile installation routine, and wherein the predefined trajectory is predefined relative to a pivot axis of the upending cradle of the pile holder.

2. The vessel according to claim 1, wherein the predefined trajectory is a curved trajectory of movement of the load connector, the curved trajectory lying within a plane that is perpendicular to the pivot axis of the upending cradle.

3. The vessel according to claim 1, wherein the computerized crane control system is provided with one or more sensors, the sensors monitoring the angle of the pile supported by the pile holder relative to the horizontal, and wherein the computerized crane control system is configured to use this information in controlling the trajectory of the load connector.

4. The vessel according to claim 1, wherein the upending cradle comprises a pivotably supported clamp, to secure the bottom section of the pile relative to an upending pivot axis, and wherein the computerized crane control system is configured to measure the angle of the clamp and use this information in controlling the trajectory of the load connector, and is provided with one or more sensors, and/or is linked to one or more sensors provided on the pivotable support clamp, the sensors monitoring the angle of the pivotable support clamp, and thus monitoring the angle relative to the horizontal of the pile supported by the clamp.

5. The vessel according to claim 1, wherein the foundation pile, when in the foundation pile overboarding position, is aligned with a pile gripper configured to maintain the wind turbine foundation pile in vertical orientation during a pile driving operation wherein the foundation pile is driven into the seabed.

6. The vessel according to claim 1, wherein the vessel further comprises a pile gripper configured to maintain a wind turbine foundation pile in vertical orientation during a pile driving operation wherein the foundation pile is driven into the seabed.

7. The vessel according to claim 6, wherein the pile gripper is moveably supported by the hull of the vessel, and is provided with a pile gripper control system configured to position the pile gripper relative to the vessel, such that the pile gripper is aligned with a foundation side installation site adjacent the vessel, and the pile gripper control system is provided to compensate for movement of the vessel relative to the installation site.

8. The vessel according to claim 7, wherein the computerised crane control system is linked with the pile gripper control system, to enable the computerised crane control system to take into account the movement of the pile gripper, and thus keep a foundation pile received in the pile gripper and supported by the load connector substantially vertical while the pile gripper is moved relative to the vessel, and thus relative to the crane mounted on the vessel.

9. The vessel according to claim 1, wherein the upending cradle is mounted on that cradle track and is configured to move along a track, during the upending of the foundation pile.

10. The vessel according to claim 1, wherein the upending cradle is configured to guide the foundation pile, while the pile, in an upended position, is lowered towards the sea floor.

11. The vessel according to claim 1, wherein the crane further comprises an observation system linked to the computerized crane control system, for tracking movement of the load connector and/or the top end of the foundation piles during the foundation pile installation routine, which observation system comprises:

at least one camera to register a crane working area view of a working area of the crane;

an augmentation system, linked with the at least one camera and with the crane control system, and configured to combine graphic crane information with the real time view registered by the camera into an augmented crane working area view; and a display linked to the augmentation system to present the augmented working area view to a crane driver.

12. The vessel according to claim 1, wherein the computerized crane control system comprises an input device that is configured to receive a foundation pile installation routine, to enable the computerized crane control system to perform said foundation pile installation routine.

13. The vessel according to claim 1, wherein the crane further comprises a collision prevention system, the collision prevention system comprising multiple proximity detectors that are located along a top section of the boom structure to scan a collision safety zone extending adjacent the top section of the boom structure, to detect an object entering the collision safety zone during a slew motion and/or a luffing motion and to subsequently present a crane driver with a warning signal and/or stop the slew motion and/or luffing motion of the boom to prevent a collision with the detected object.

14. The vessel according to claim 1, wherein the crane is a first crane and wherein the vessel further comprises a second crane, the second crane being similar to the first crane, for, in addition to the first crane, supporting the foundation pile, wherein the computerized crane control system is linked to a slew drive, a luffing drive, and a hoisting winch of the second crane, and wherein the computerized crane control system is programmed to perform the foundation pile installation routine providing a coordinated pattern of slew motion of the superstructure and of luffing motion of the boom structure, as well as operation of the hoisting winch of both the first crane and the second crane so that the load connector of the first crane and the load connector of the second crane each move from a foundation pile pick up position thereof where the load connector is connected to a horizontally oriented foundation pile stored on the deck to a foundation pile upended position thereof wherein the foundation pile is in vertical position and is suspended from at least the load connector of the first crane.

15. The vessel according to claim 14, wherein the computerized crane control system can be linked in a master-slave configuration for hoisting a single load with both cranes, wherein, when the computerized control system is in the master-slave configuration, a crane driver runs the first crane and the computerized crane control system makes the second crane move with the first crane and keeps the load connector of the second crane in a fixed position relative to the load connector of the first crane during the hoisting process.

16. The vessel according to claim 1, wherein the computerised crane control system is provided with sensors or other input devices, that provide the computerised crane control system with real time spatial information of the predefined path and of possible collision objects located on the predefined path and/or on relative movement of the vessel or the load due to for example wind or heave, and wherein the computerized crane control system is configured to dynamically adjust the path to prevent a collision and/or the load from deviating from the predefined path and/or to stop the hoisting routine to prevent a collision or the load form deviating from the predefined path.

17. A crane for providing the vessel according to claim 1.

18. A method for installation of a pile adapted to support an offshore wind turbine, using the vessel according to claim 1, the method comprising the following steps:

transporting a pile in a horizontal orientation to an offshore installation site;

positioning the pile in a pile holder on the wind turbine installation vessel, wherein the pile holder engages with a circumference of the pile at a lower side thereof to hold the pile in order to limit movement of the lower end of the pile in a direction perpendicular to a longitudinal axis of the pile, and wherein the pile holder engages the lower end of the pile in order to limit movement of the pile in a direction parallel to the longitudinal axis of the pile;

lifting an upper end portion of the pile, thereby rotating the pile from a horizontal orientation to a vertical orientation about a substantially horizontal rotation axis; and lowering the pile into the water while guided by the upending cradle of the pile holder, wherein the step of lifting is performed by the computerized crane control system.

19. The method according to claim 18, wherein the step of lowering further comprises lowering the pile until the pile reaches the sea bottom and until passive lowering of the pile, due to gravity sinking the pile into the sea bed, stops.

\* \* \* \* \*